US011372867B2

United States Patent
Kalou et al.

(10) Patent No.: US 11,372,867 B2
(45) Date of Patent: Jun. 28, 2022

(54) BOOTSTRAPPED RELEVANCE SCORING SYSTEM

(71) Applicant: Citrix Systems, Inc., Fort Lauderdale, FL (US)

(72) Inventors: Aikaterini Kalou, Patras (GR); Kostas Katrinis, Pastras (GR)

(73) Assignee: Citrix Systems, Inc., Fort Lauderdale, FL (US)

( * ) Notice: Subject to any disclaimer, the term of this patent is extended or adjusted under 35 U.S.C. 154(b) by 99 days.

(21) Appl. No.: 17/034,752

(22) Filed: Sep. 28, 2020

(65) Prior Publication Data

US 2022/0075788 A1    Mar. 10, 2022

Related U.S. Application Data

(63) Continuation of application No. PCT/GR2020/000043, filed on Sep. 9, 2020.

(51) Int. Cl.
*G06F 16/2457* (2019.01)
*G06F 16/248* (2019.01)
*G06N 20/00* (2019.01)

(52) U.S. Cl.
CPC ...... *G06F 16/24578* (2019.01); *G06F 16/248* (2019.01); *G06N 20/00* (2019.01)

(58) Field of Classification Search
CPC ............. G06F 16/24578; G06F 16/248; G06F 16/9035; G06N 20/00
See application file for complete search history.

(56) References Cited

U.S. PATENT DOCUMENTS

| | | | | |
|---|---|---|---|---|
| 9,626,629 | B2* | 4/2017 | Vijayaraghavan | G06N 5/025 |
| 2012/0137367 | A1* | 5/2012 | Dupont | G06F 21/00 726/25 |
| 2013/0290110 | A1* | 10/2013 | LuVogt | G06Q 30/02 705/14.66 |
| 2013/0290339 | A1* | 10/2013 | LuVogt | G06F 16/9535 707/E17.089 |
| 2017/0132230 | A1 | 5/2017 | Muralidhar et al. | |
| 2019/0384469 | A1 | 12/2019 | Lo et al. | |
| 2020/0221181 | A1 | 7/2020 | Gupta et al. | |

OTHER PUBLICATIONS

International Search Report and Written Opinion dated Jun. 10, 2021 for International Patent Application No. PCT/GR2020/000043.

* cited by examiner

*Primary Examiner* — Jorge A Casanova
(74) *Attorney, Agent, or Firm* — Pierce Atwood LLP

(57) ABSTRACT

In accordance with one example method, a computing system may determine that first user profile data of a first user of a relevance scoring service is similar to second user profile data of a second user of the relevance scoring service, where the relevance scoring service is configured to assign first relevance scores to first information chunks to be presented to the first user based at least part on at least a first portion of first stored behavior data of the first user, and where the first stored behavior data is indicative of the first user's interactions with second information chunks previously presented to the first user. In response to determining that the first user profile data is similar to the second user profile data, the relevance scoring service may be configured to assign second relevance scores to third information chunks to be presented to the second user based at least in part on at least a second portion of the first stored behavior data.

23 Claims, 10 Drawing Sheets

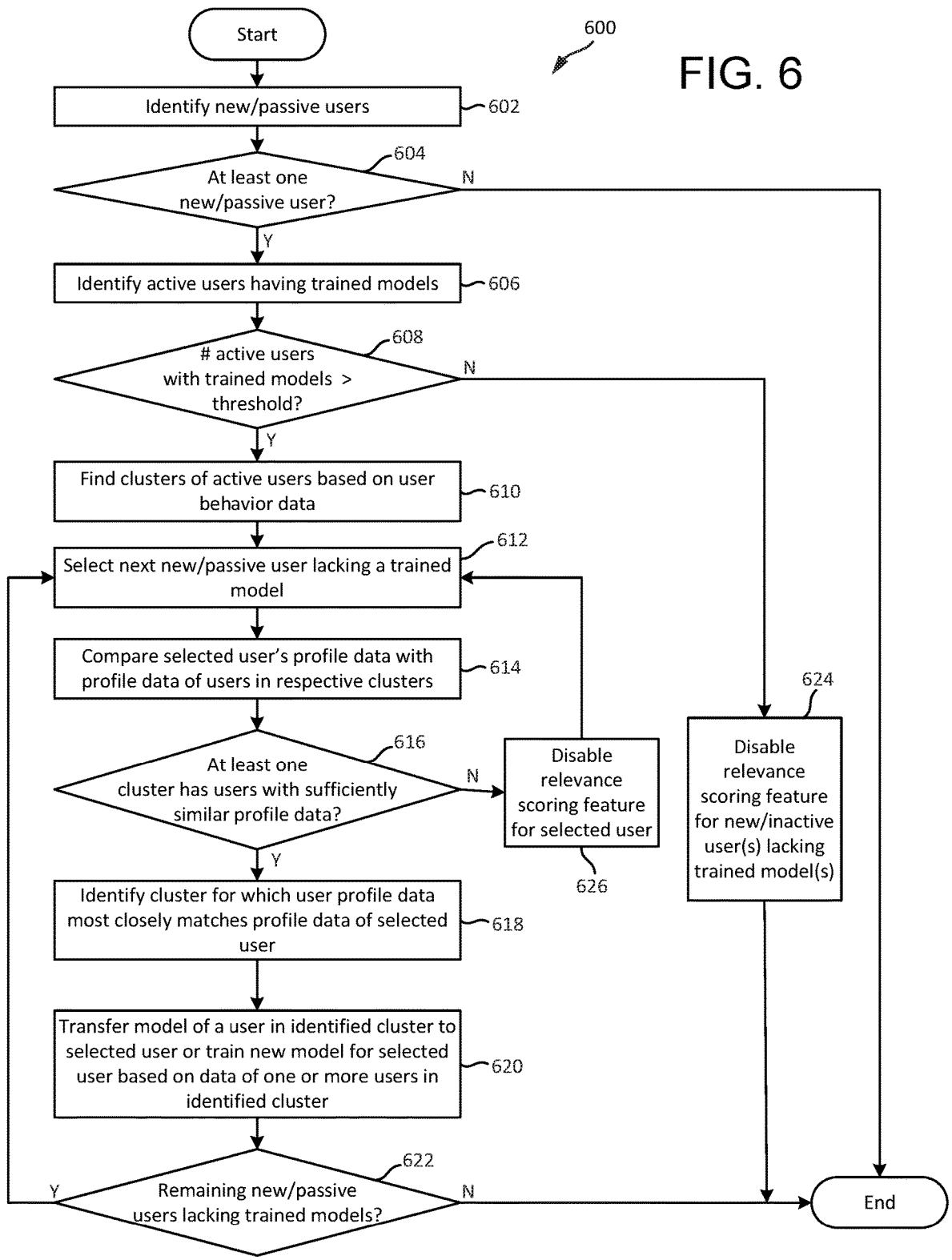

BOOTSTRAPPED RELEVANCE SCORING SYSTEM

CROSS-REFERENCE TO RELATED APPLICATIONS

This application is a continuation of and claims the benefit under 35 U.S.C. § 120 and 35 U.S.C. § 365(c) to International Application PCT/GR2020/000043, entitled BOOTSTRAPPED RELEVANCE SCORING SYSTEM, with an international filing date of Sep. 9, 2020, the entire contents of which are incorporated herein by reference for all purposes.

BACKGROUND

Various systems have been developed that allow client devices to access applications and/or data files over a network. Certain products offered by Citrix Systems, Inc., of Fort Lauderdale, Fla., including the Citrix Workspace™ family of products, provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method comprises determining, by a computing system, that first user profile data of a first user of a relevance scoring service is similar to second user profile data of a second user of the relevance scoring service, the relevance scoring service being configured to assign first relevance scores to first information chunks to be presented to the first user based at least part on at least a first portion of first stored behavior data of the first user, the first stored behavior data being indicative of the first user's interactions with second information chunks previously presented to the first user. In response to determining that the first user profile data is similar to the second user profile data, the relevance scoring service is configured to assign second relevance scores to third information chunks to be presented to the second user based at least in part on at least a second portion of the first stored behavior data.

In some embodiments, a system comprises at least one processor, and at least one computer-readable medium encoded with instructions which, when executed by the at least one processor, cause the system to determine that first user profile data of a first user of a relevance scoring service is similar to second user profile data of a second user of the relevance scoring service, the relevance scoring service being configured to assign first relevance scores to first information chunks to be presented to the first user based at least part on at least a first portion of first stored behavior data of the first user, the first stored behavior data being indicative of the first user's interactions with second information chunks previously presented to the first user, and, in response to determining that the first user profile data is similar to the second user profile data, to configure the relevance scoring service to assign second relevance scores to third information chunks to be presented to the second user based at least in part on at least a second portion of the first stored behavior data.

In some embodiments, at least one non-transitory computer-readable medium is encoded with instructions which, when executed by at least one processor of a computing system, cause the computing system to determine that first user profile data of a first user of a relevance scoring service is similar to second user profile data of a second user of the relevance scoring service, the relevance scoring service being configured to assign first relevance scores to first information chunks to be presented to the first user based at least part on at least a first portion of first stored behavior data of the first user, the first stored behavior data being indicative of the first user's interactions with second information chunks previously presented to the first user, and, in response to determining that the first user profile data is similar to the second user profile data, to configure the relevance scoring service to assign second relevance scores to third information chunks to be presented to the second user based at least in part on at least a second portion of the first stored behavior data.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 6 is a flowchart showing a first example routine that may be performed by the user similarity matching service of the bootstrapped relevance scoring system shown in FIG. 1.

DETAILED DESCRIPTION

Figure 1:
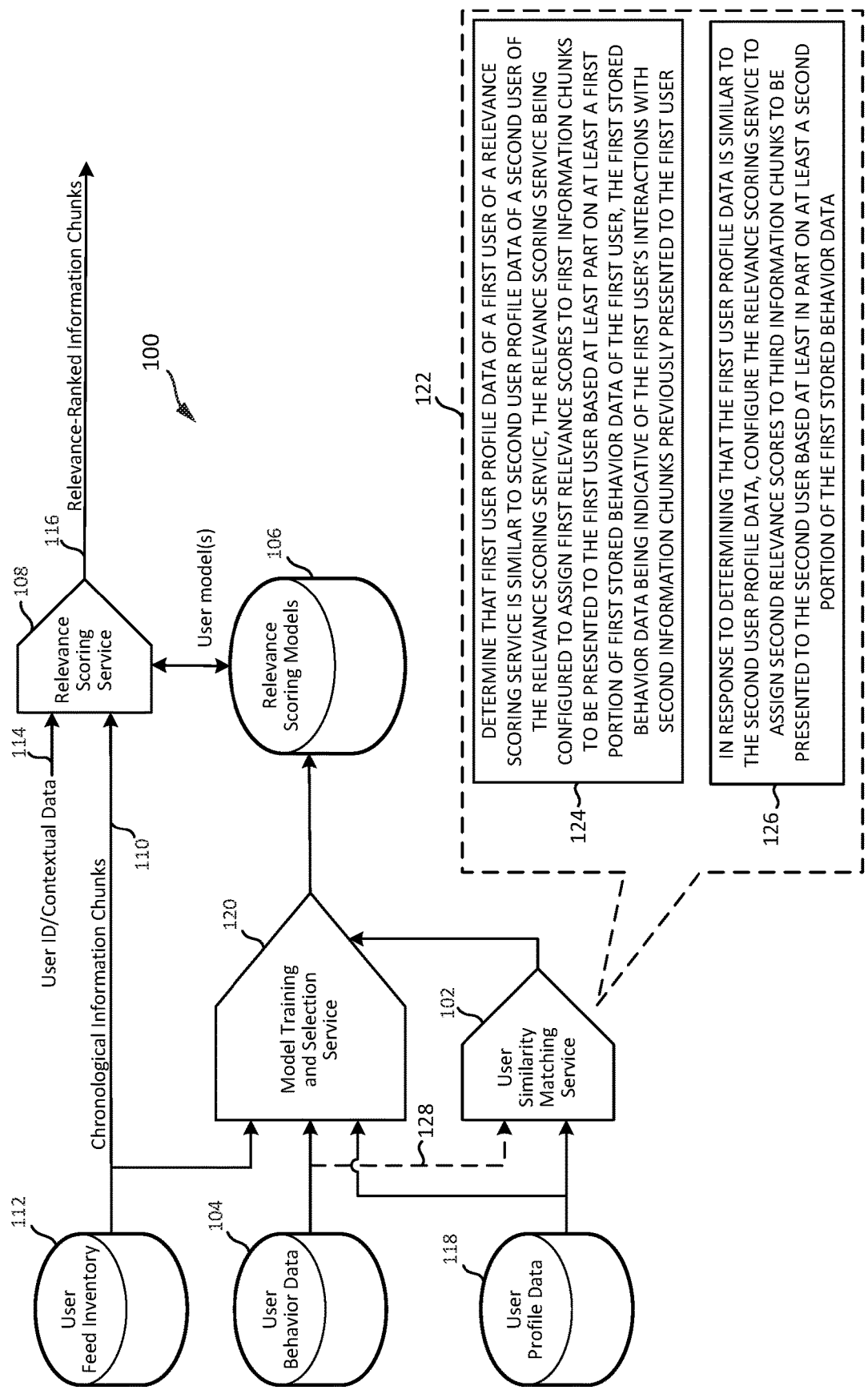
FIG. 1 shows a high-level example implementation of a bootstrapped relevance scoring system configured in accordance with some aspects of the present disclosure.

For purposes of reading the description of the various embodiments below, the following descriptions of the sections of the specification and their respective contents may be helpful:

Section A provides an introduction to example embodiments of a bootstrapped relevance scoring system;

Section B describes a network environment which may be useful for practicing embodiments described herein;

Section C describes a computing system which may be useful for practicing embodiments described herein;

Section D describes embodiments of systems and methods for accessing computing resources using a cloud computing environment;

Section E describes embodiments of systems and methods for managing and streamlining access by clients to a variety of resources;

Section F provides a more detailed description of example embodiments of the bootstrapped relevance scoring system that was introduced above in Section A; and Section G describes example implementations of methods, systems/devices, and computer-readable media in accordance with the present disclosure.

A. Introduction to Illustrative Embodiments of a Bootstrapped Relevance Scoring System An intelligent activity feed, such as that offered by the Citrix Workspace™ family of products, provides significant benefits, as it allows a user to respond to application-specific events generated by disparate systems of record, without requiring the user to switch context and separately launch the respective applications to take actions with respect to the different events. An example of a system capable of providing such an activity feed is described in Section E below in connection with FIGS. 5A-D. In such a system, a remote computing system may be responsible for monitoring and interacting with various systems of record (e.g., SaaS applications, web applications, Windows applications, Linux applications, desktops, file repositories and/or file sharing systems, etc.) on behalf of a user operating a client device. As Section E describes (in connection with FIGS. 5C and 5D), a user 524 may operate a client device 202 so as to interact with "microapps" corresponding to particular functionalities of a variety of systems of record 526, and such microapps may, in turn, interact with the systems of record 526, e.g., via application programming interfaces (APIs) of such systems, on behalf of the user 524.

More specifically, and as described in more detail in Section E, a microapp service 528 (shown in FIG. 5C) may periodically request a sync with a data integration provider service 530, so as to cause active data to be pulled from the systems of record 526. In some implementations, for example, the microapp service 528 may retrieve encrypted service account credentials for the systems of record 526 from a credential wallet service 532 and request a sync with the data integration provider service 530. The data integration provider service 530 may then decrypt the service account credentials and use those credentials to retrieve data from the systems of record 526. The data integration provider service 530 may then stream the retrieved data to the microapp service 528. The microapp service 528 may store the received systems of record data in the active data cache service 534 and also send raw events to an analytics service 536 for processing. The analytics service 536 may generate and/or enrich notifications (e.g., targeted scored notifications) and send such notifications to the notification service 538. The notification service 538 may store the notifications in a database to be later served in an activity feed and/or may send the notifications out immediately to the client 202 as a push notification to the user 524.

Figure 5A:
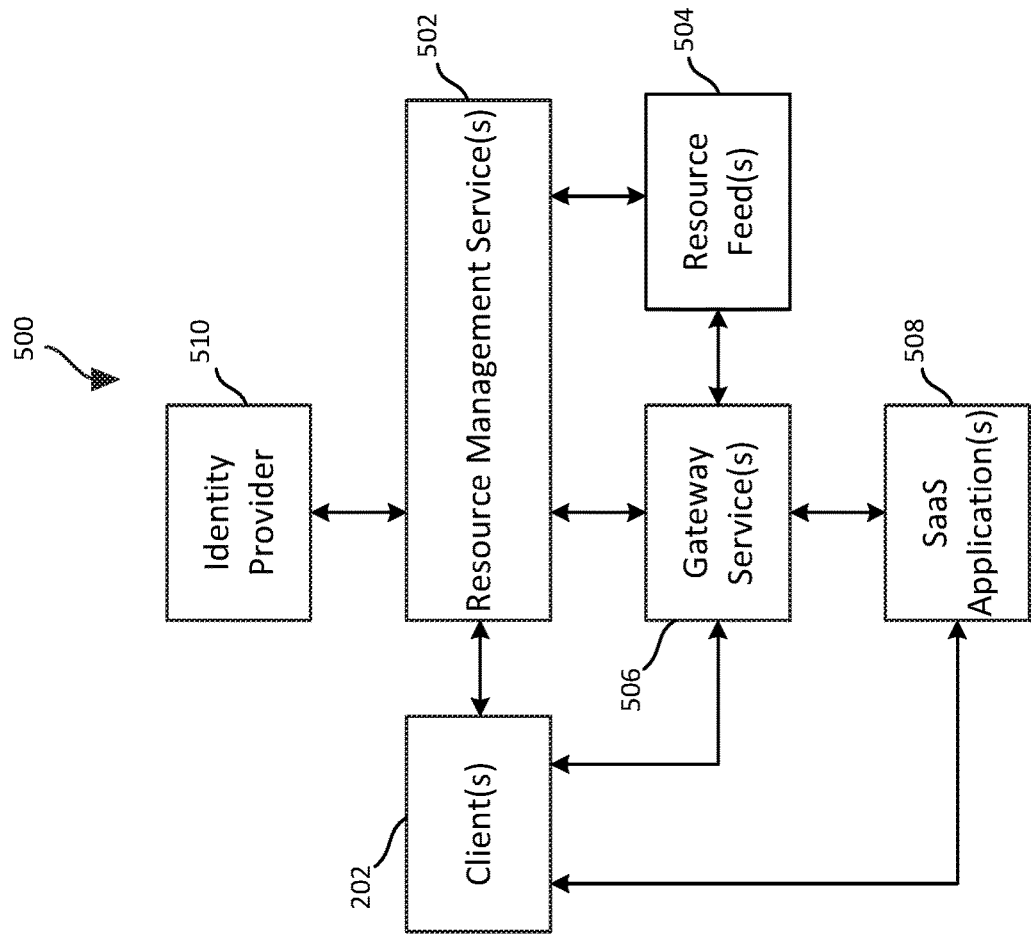
FIG. 5A is a block diagram of an example system in which resource management services may manage and streamline access by clients to resource feeds (via one or more gateway services) and/or software-as-a-service (SaaS) applications.
Figure 5B:
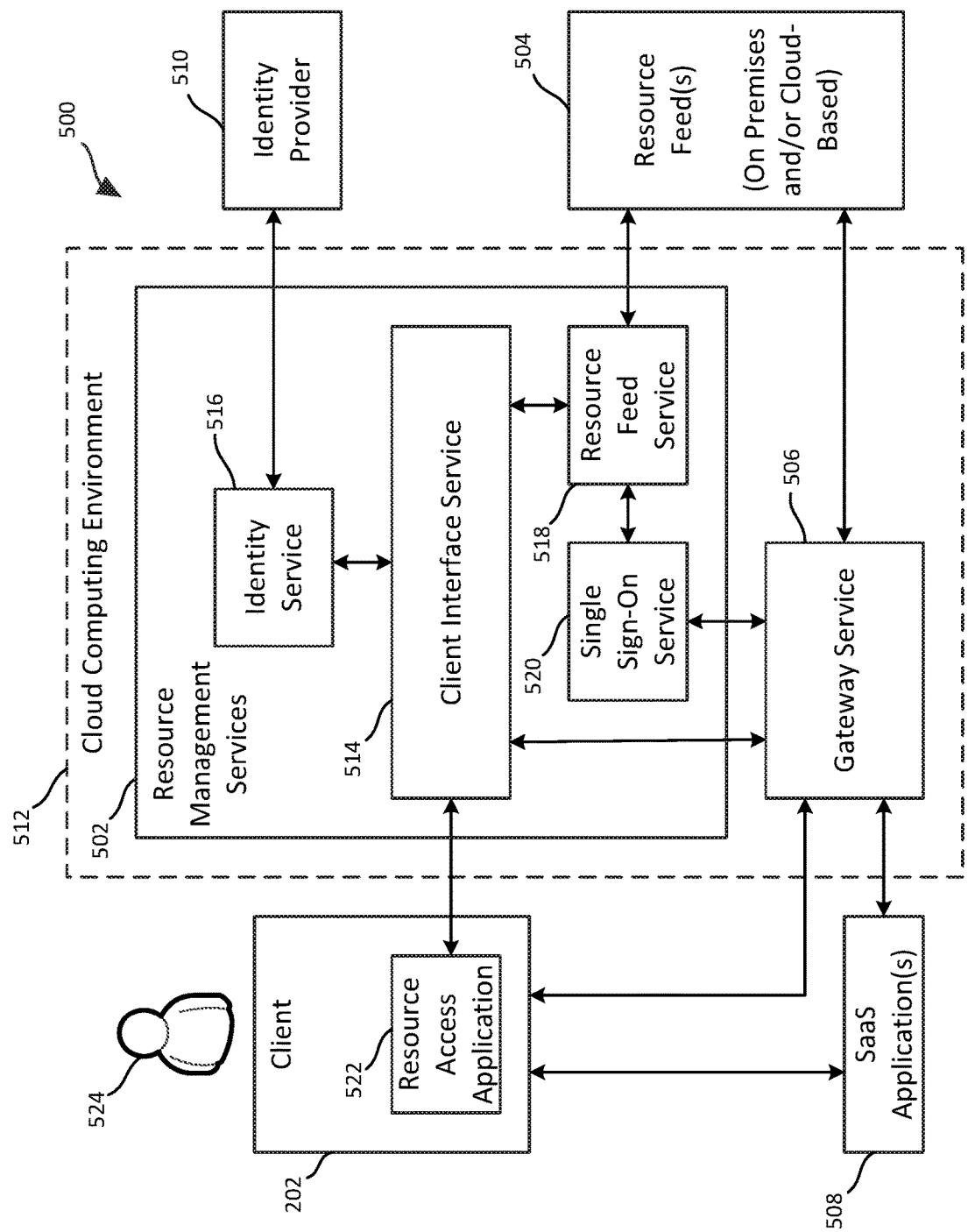
FIG. 5B is a block diagram showing an example implementation of the system shown in FIG. 5A in which various resource management services as well as a gateway service are located within a cloud computing environment.
Figure 5C:
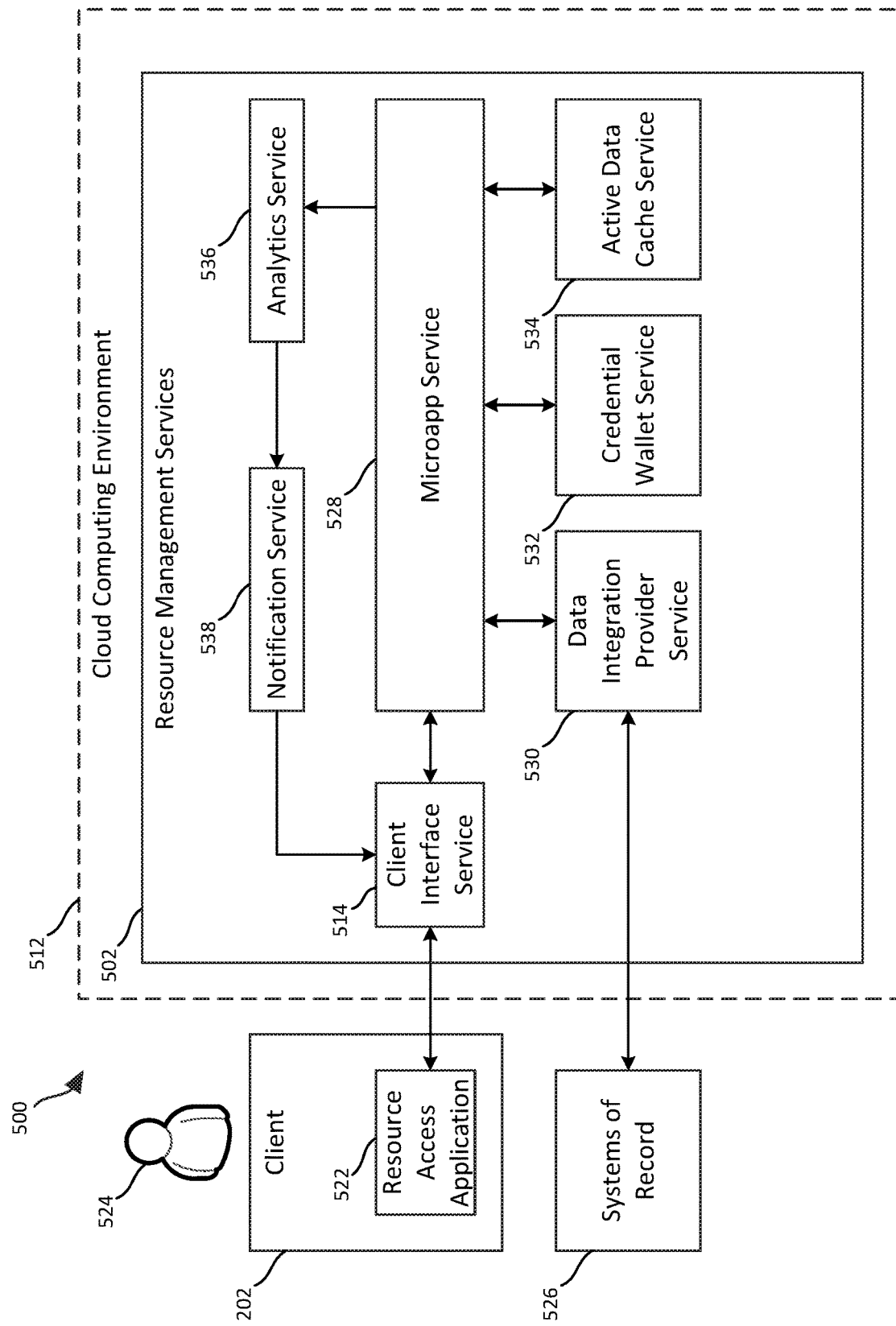
FIG. 5C is a block diagram similar to that shown in FIG. 5B but in which the available resources are represented by a single box labeled "systems of record," and further in which several different services are included among the resource management services.
Figure 5D:
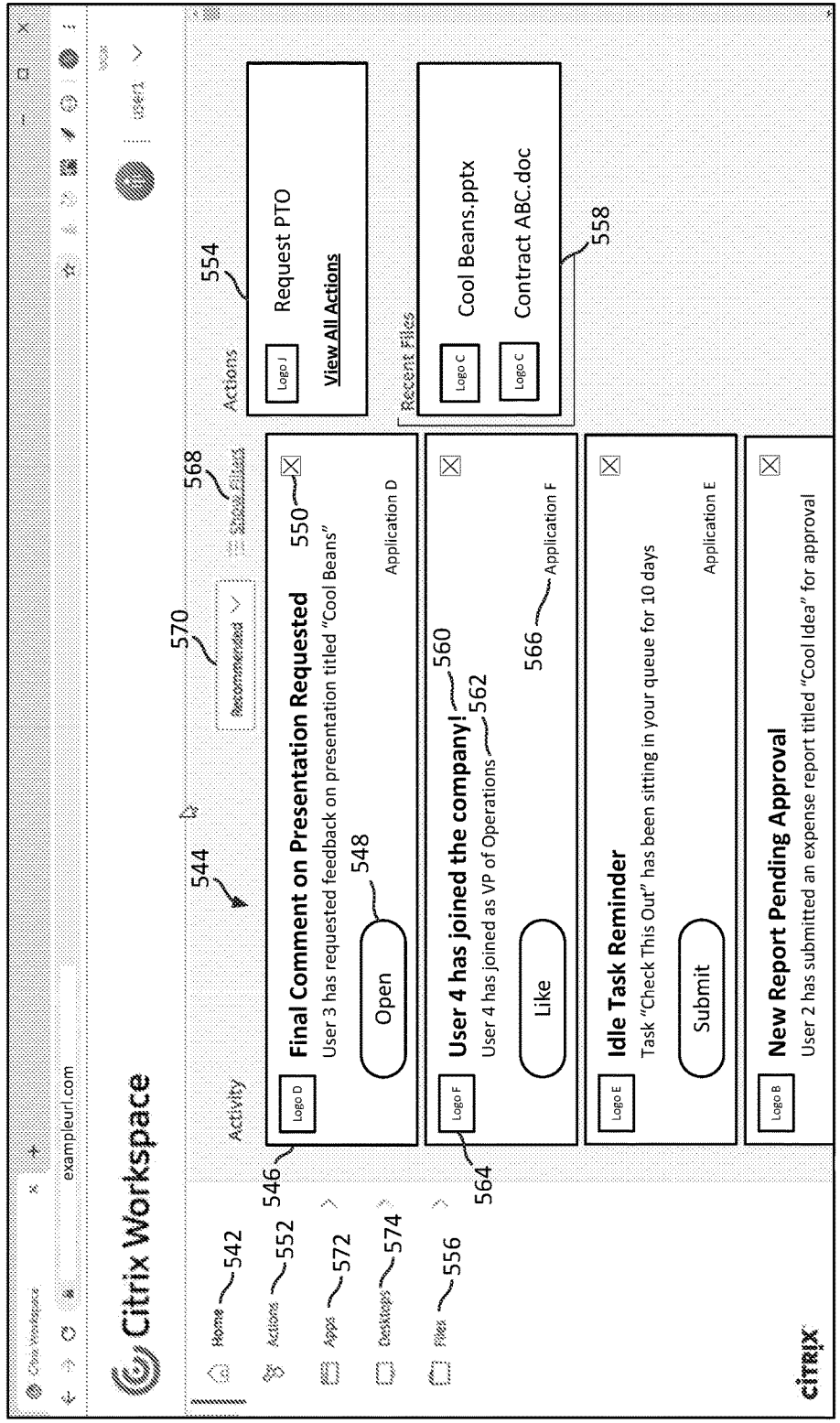
FIG. 5D shows how a display screen may appear when an intelligent activity feed feature of a multi-resource management system, such as that shown in FIG. 5C, is employed.

FIG. 5D, which is also described in more detail in Section E, shows how a display screen 540 presented by a resource access application 522 (shown in FIG. 5C) may appear when an intelligent activity feed feature is employed and a user 524 is logged on to the system. As shown in FIG. 5D, an activity feed 544 may be presented on the display screen 540 that includes a plurality of notifications 546 about respective events that occurred within various applications to which the user 524 has access rights. As described below (in connection with FIG. 5D), in some implementations, the notifications 546 may be sorted and/or filtered in various ways to improve the accessibility of the notifications 546 to the user 524. For example, as shown in FIG. 5D, in some implementations, the user 524 may manipulate a user-interface element 570 to select a "recommended" mode in which the notifications 546 may be sorted based on relevancy scores that were assigned to them by the analytics service 536. Further, although not illustrated in FIG. 5D, in some implementations, the user 524 may additionally or alternatively select a "time & date" mode, e.g., using the element 570, in which the notifications may be sorted based on timestamps indicating when the notifications 546 were created, and/or may select an "application" mode, e.g., using the element 570, in which the notifications 546 may be sorted by application type.

The inventors have recognized and appreciated that relevance scoring techniques the analytics service 536 employs can be of limited value for new users of the multi-resource access system 500 and/or users who have not been actively interacting with the system 500. In particular, because the analytics service 536 relies upon accumulated data concerning the past behavior of users to train one or more relevance scoring models for those users, the system 500 may not have accumulated a sufficient amount of recent, user-specific behavior data to generate useful relevance scoring models for new or relatively inactive users. The inventors have further recognized and appreciated that this problem is not unique to a system that assigns relevance scores to notifications 546 about detected events within systems of record 526. That is, the inventors have recognized and appreciated that the same problem may exist within any system that endeavors to assign user-specific (or group-specific), behavior-driven relevance scores to incoming "chunks" of information, so as to allow such chunks to be reordered in accordance with their predicted relevance to a given user/group.

Offered is a system that enables trained models and/or historical data of other users/groups to be bootstrapped to identify existing trained models and/or generate new trained models for new and/or insufficiently active users/groups (referred to herein as "passive" users/groups) for whom an adequate amount of recent user/group-specific data has not been accumulated to generate a suitable trained model using traditional techniques.

FIG. 1 shows an example implementation of a bootstrapped relevance scoring system 100 configured in accordance with some embodiments of the present disclosure. As shown, and as explained in more detail below, the system 100 may advantageously be provisioned with a user similarity matching service 102 that facilitates the bootstrapping of (A) historical behavior data of other users, e.g., from a "user behavior data" storage medium 104, and/or (B) predictive models previously generated based on such data, e.g., from a "relevance scoring models" storage medium 106. In particular, the user similarity matching service 102 may identify one or more active users (or groups of users) who share similar user profile characteristics with a new or passive user (or group of users), and may (A) transfer one or more relevance scoring models (e.g., stored in the storage medium 106) for a sufficiently similar active user (or group) to the new/passive user (or group), and/or (B) may use the historical behavior data for one or more sufficiently similar active users (or groups) to generate one or more new relevance scoring models for the new/passive user (or group). As explained in more detail below, in some implementations, a model training and selection service 120 may train the relevance scoring models for active users (or groups) that are stored in the "relevance scoring models" storage medium 106 based on user-specific data obtained from the "user behavior data" storage medium 104, the "user feed inventory" storage medium 112, and/or the "user profile data" storage medium 118.

As shown in FIG. 1, the system 100 may include a relevance scoring service 108 that is configured to receive a set of information chunks 110 for a particular user, e.g., from a "user feed inventory" storage medium 112, as well as data 114 identifying the user, and to use one or more relevance scoring models assigned to the identified user, e.g., retrieved from the "relevance scoring models" storage medium 106, to assign relevance scores to the respective information chunks 110, thus generating relevance-ranked information chunks 116. As indicated, in some implementations, the data 114 input to the relevance scoring service 108 may additionally include information indicative of the current context of a client device 202 (e.g., as shown in FIGS. 2, 4 and 5A-C) being operated by the user (e.g., device ID, device type, time of day, a current network connection, current location, etc.) for evaluation by one or more user-specific relevance scoring models and/or for selecting one or more user-specific relevance scoring models that are appropriate for a given context. As FIG. 1 illustrates, while the information chunks 110 input to the relevance scoring service 108 may, in some implementations, be sorted chronologically, e.g., based on time stamps indicating when they were created, the relevance-ranked information chunks 116 output by the relevance scoring service 108 may additionally be sorted based on their predicted relevance, e.g., using relevance scores assigned by the relevance scoring service 108. With respect to FIG. 1, it should be appreciated that even though the relevance scoring service 108 is described as assigning relevance scores to information chunks 110 for a particular user, the relevance scoring service 108 may, in some implementations, likewise assign relevance scores to information chunks 110 for a particular group of users of the system 100.

In some implementations, the information chunks 110 may be notifications 546 that are to be included in an activity feed 544 for a user 524 of a multi-resource access system 500, such as described below in connection with FIGS. 5C and 5D. In such implementations, the relevance scoring model(s) for an active user 524 (e.g., stored in the storage medium 106) may be trained to predict how relevant respective ones of the user's pending notifications 546 are likely to be that user. Such relevance scoring model(s) may be trained, for example, based on (A) historical feed data concerning notifications 546 in the user's activity feed 544 (e.g., stored in the "user feed inventory" storage medium 112), (B) behavior data concerning the user's past interactions with the user's activity feed 544 (e.g., stored in the storage medium 104), and/or (C) user profile data from the user's profile (e.g., stored in a "user profile data" storage medium 118), such as the user's job title, organizational role, indicated preferences, etc.

In other implementations, the information chunks 110 shown in FIG. 1 may, for example, be e-commerce items that are to be presented to a user of a client device 202 as a part of an up-selling or cross-selling campaign. In such implementations, the relevance scoring model(s) for an active user (e.g., stored in the storage medium 106) may be trained to predict a likelihood that the user will purchase respective ones of a collection of the e-commerce items. Such relevance scoring model(s) may be trained, for example, based on behavior data concerning the user's past interactions with particular ecommerce items (e.g., stored in the "user behavior data" storage medium 104) and/or electronic shopping carts and/or data from the user's profile (e.g., stored in a "user profile data" storage medium 118), such as demographic data, indicated preferences, etc.

In still other implementations, the information chunks 110 may, for example, be items for a user's social media feed. In such implementations, the relevance scoring model(s) for an active user (e.g., stored in the storage medium 106) may be trained to predict how relevant the user is likely to find particular items in the feed. Such relevance scoring model(s) may be trained, for example, based on behavior data concerning the user's past interactions with items in the user's social media feed (e.g., stored in the "user behavior data" storage medium 104) and/or data from the user's profile (e.g., stored in a "user profile data" storage medium 118), such as demographic data, indicated preferences, etc.

The foregoing implementations are but a few examples of the wide variety of environments in which the bootstrapped relevance scoring system 100 disclosed herein may be deployed. The systems and methods disclosed herein may further be applicable to recommending relevance of any of a number of other type of discrete chunks of information, be it files (text or binary), e-mail, ranking of application/desktops or online collaboration (e.g. forum entries), etc. Indeed, the system 100 may be deployed in any circumstance in which a relevance scoring service 108 is provided for a particular information type (e.g., a text categorization system for textual content, a video similarity system for video content, etc.). The novel systems and methods for bootstrapping relevance scoring systems may be beneficially employed regardless of types of information that are categorized by such systems.

Solely for the sake of simplicity, and without limitation with respect to its broader applicability in other environments, the remainder of this disclosure will describe example implementations of the bootstrapped relevance scoring system 100 in connection with a "digital workspace" environment, such as that provided by the multi-resource access system 500 described in Section E. Further, also solely for the sake of simplicity, the remainder of this disclosure will describe examples of relevance scoring models that are personalized to individual users, without limitation with respect to the broader applicability of the system 100 to relevance scoring models for particular groups of users.

As noted above, the user similarity matching service 102 of the system 100 (shown in FIG. 1) may identify one or more "active" users who share similar user profile characteristics with a new or passive user, and may (A) transfer one or more relevance scoring models (e.g., stored in the storage medium 106) for one or more sufficiently similar active user to the new/passive user, and/or (B) may use the historical behavior data for one or more sufficiently similar active users to generate one or more new relevance scoring models for the new/passive user.

The user similarity matching service 102 may employ any of a number of techniques to identify one or more "active" users who share similar user profile characteristics with a new or passive user. In some implementations, for example, the user similarity matching service 102 may evaluate notification feed data (e.g., from the "user feed inventory" storage medium 112) and/or behavior data (e.g., from the "user behavior data" storage medium 104) of active users to identify clusters of active users with similar activity feeds 544 and/or similar behavioral patterns with respect to how they interact with their activity feeds 544. After identifying such clusters, the user similarity matching service 102 may then compare the user profile data for the new/passive user with the user profile data for the active users in the respective clusters to identify the cluster with the most closely matching user profile data. The user similarity matching service 102 may then either (A) transfer a relevance scoring model for one of the active users in the identified cluster (e.g., the active user having a user profile that is most similar to the new/passive user), or (B) use the historical behavior data for two or more users within the identified cluster (e.g., a set of "N" users in the cluster whose user profile data most closely matches the new/passive user) to train a new relevance scoring model for the new/passive user. Additional details concerning the foregoing example implementation are provided below in connection with FIG. 6.

In other implementations, the user similarity matching service 102 may instead evaluate the user profile data of both active users and a new/passive user (e.g., from the "user profile data" storage medium 118) to identify clusters of users having similar user profile data. For example, in some implementations, the user profile data of the various users may be encoded into feature vectors representing respective points in a multi-dimensional vector space, and a clustering process, e.g., K-means clustering, may be used to identify clusters of such "user profile data points." The user similarity matching service 102 may then either (A) transfer a relevance scoring model for one of the active users in the same cluster as the new/passive user (e.g., the active user whose user profile data point is closest to the user profile data point of the new/passive user in the multi-dimensional space), or (B) use the historical behavior data for two or more users within the same cluster as the new/passive user (e.g., a set of "N" users whose user profile data point is closest to the user profile data point of the new/passive user in the multi-dimensional space) to train a new relevance scoring model for the new/passive user. In FIG. 1, an arrow 128 leading from the "user behavior data" storage medium 104 and the user similarity matching service 102 is dashed to indicate that the similarity matching service 102 need not employ behavior data from the storage medium 104 to identify similar users in such an implementation. Additional details concerning the foregoing example implementation are provided below in connection with FIG. 7.

FIG. 1 shows an example routine 122 that may be performed by the user similarity matching service 102 in accordance with some implementations of the present disclosure. As shown, at a step 124 of the routine 122, the user similarity matching service 102 may determine that first user profile data of a first user (e.g., stored in the "user profile data" storage medium 118) of a relevance scoring service 108 is similar to second user profile data of a second user (e.g., stored in the "user profile data" storage medium 118) of the relevance scoring service 108. Examples of how such a similarity determination may be made are described above, and are also further elaborated on below in Section F.

As the text of the step 124 indicates, the relevance scoring service 108 may be configured to assign relevance scores (e.g., first relevance scores) to information chunks 110 (e.g., first information chunks) to be presented to the first user, with such configuration being based at least part on at least a portion (e.g., a first portion) of stored behavior data of the first user (e.g., first stored behavior data that is stored in the "user behavior data" storage medium 104). As the step 124 further indicates, the stored behavior data that is used to so configure the relevance scoring service 108 (i.e., the first portion of the first stored behavior data) may be indicative of the first user's interactions with other information chunks (e.g., second information chunks) that were previously presented to the first user. In some implementations, for example, the manner in which the first user previously interacted with such second (previously-presented) information chunks may have been monitored and data indicative of those earlier interactions may have been recorded (as the first stored behavior data) in the "user behavior data" storage medium 104. The model training and selection service 120 may then have used at least a portion (e.g., at least the first portion) of that first stored behavior data to train a relevance scoring model for the first user and may then have stored that trained relevance scoring model in the "relevance scoring models" storage medium 106. In such an implementation, the storage of such a trained relevance scoring model for the first user in the "relevance scoring models" storage medium 106 may have resulted in the relevance scoring service 108 being configured to assign first relevance scores to first information chunks 110 that are to be presented to the first user.

At a step 126 of the routine 122, in response to determining that the first user profile data is similar to the second user profile data, the user similarity matching service 102 may configure the relevance scoring service 108 to assign second relevance scores to third information chunks to be presented to the second user based at least in part on at least a second portion of the first stored behavior data (e.g., stored in the "user behavior data" storage medium 104). As noted above, in some implementations, the user similarity matching service 102 may so configure the relevance scoring service 108 either by instructing the relevance scoring service 108 to use a relevance scoring model for the first user (e.g., from the "relevance scoring models" storage medium 106) to assign relevance scores to the information chunks 110 for the second user, or by instructing the model training and selection service 120 to use the behavior data of the first user (e.g., from the "user behavior data" storage medium 104) to train a new relevance scoring model for the second user.

Additional details and example implementations of embodiments of the present disclosure are set forth below in Section F, following a description of example systems and network environments in which such embodiments may be deployed.

B. Network Environment

Figure 2:
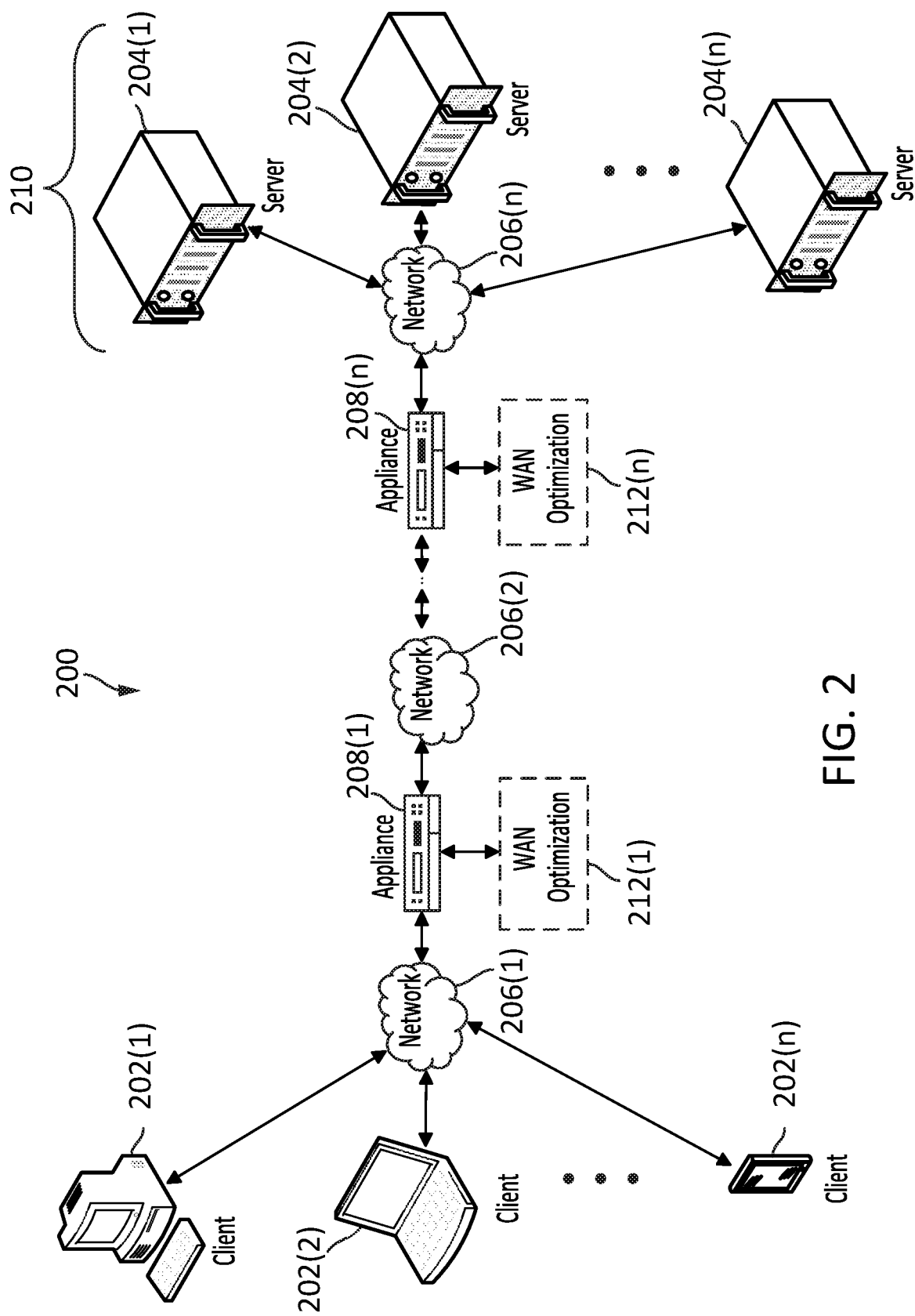
FIG. 2 is a diagram of a network environment in which some embodiments of the bootstrapped relevance scoring system disclosed herein may deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, Fla., such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of+ an organization.

C. Computing Environment

Figure 3:
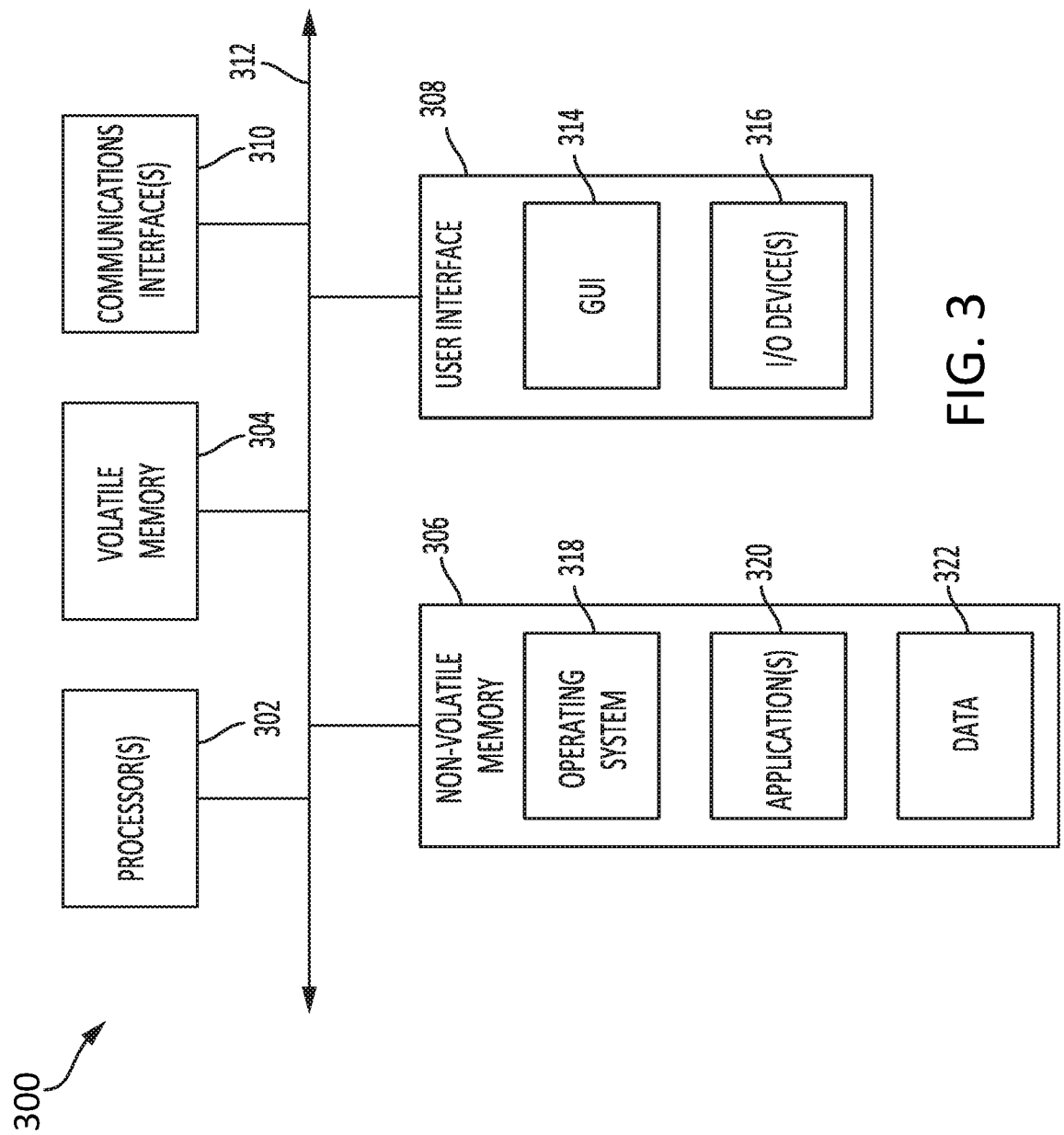
FIG. 3 is a block diagram of a computing system that may be used to implement one or more of the components of the computing environment shown in FIG. 2 in accordance with some embodiments.
Figure 4:
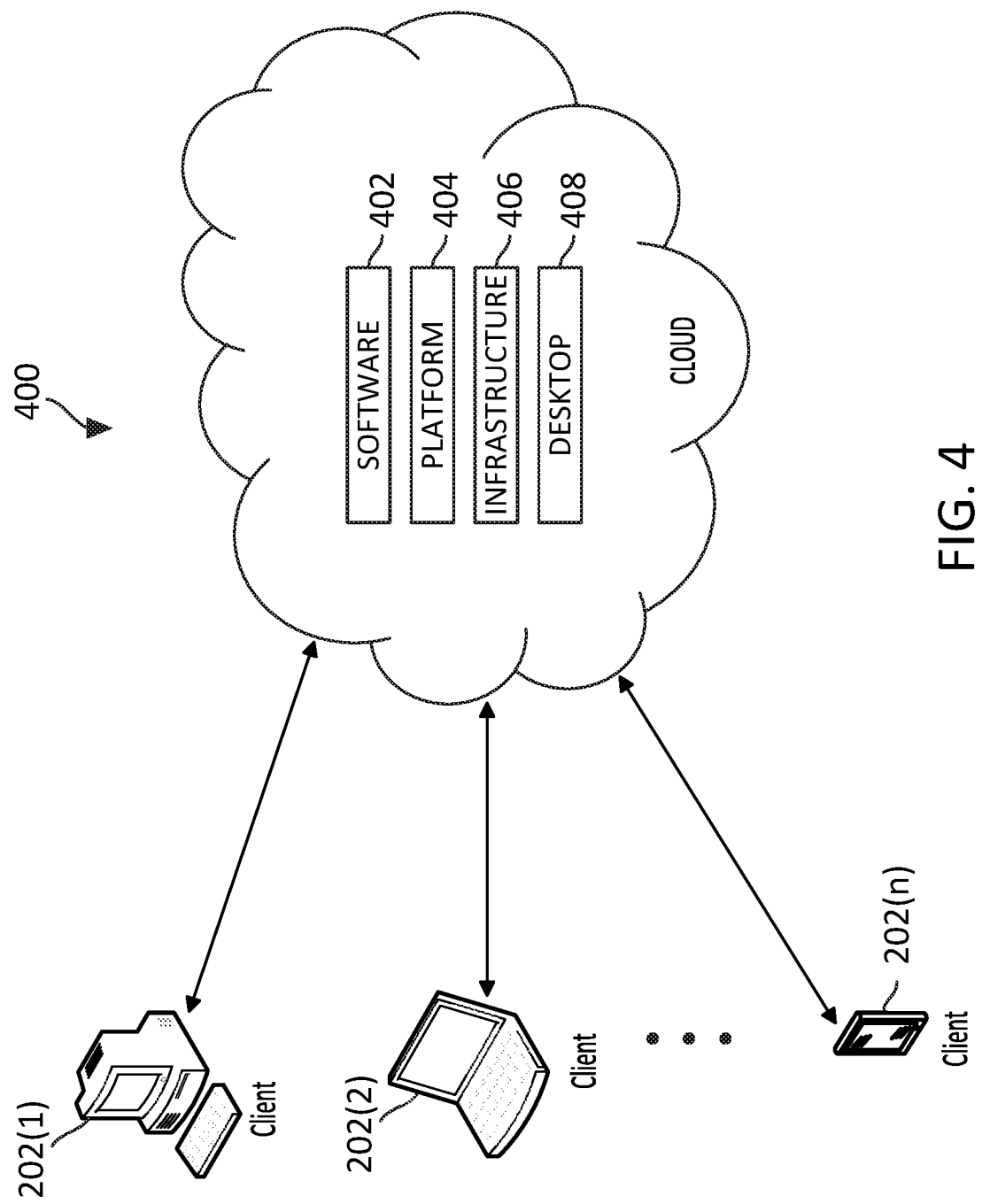
FIG. 4 is a schematic block diagram of a cloud computing environment in which various aspects of the disclosure may be implemented.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS platforms include AMAZON WEB SERVICES provided by Amazon.com, Inc., of Seattle, Wash., Azure IaaS provided by Microsoft Corporation or Redmond, Wash., RACKSPACE CLOUD provided by Rackspace US, Inc., of San Antonio, Tex., Google Compute Engine provided by Google Inc. of Mountain View, Calif., and RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

E. Systems and Methods for Managing and Streamlining Access by Client Devices to a Variety of Resources FIG. 5A is a block diagram of an example multi-resource access system 500 in which one or more resource management services 502 may manage and streamline access by one or more clients 202 to one or more resource feeds 504 (via one or more gateway services 506) and/or one or more software-as-a-service (SaaS) applications 508. In particular, the resource management service(s) 502 may employ an identity provider 510 to authenticate the identity of a user of a client 202 and, following authentication, identify one or more resources the user is authorized to access. In response to the user selecting one of the identified resources, the resource management service(s) 502 may send appropriate access credentials to the requesting client 202, and the client 202 may then use those credentials to access the selected resource. For the resource feed(s) 504, the client 202 may use the supplied credentials to access the selected resource via a gateway service 506. For the SaaS application(s) 508, the client 202 may use the credentials to access the selected application directly.

The client(s) 202 may be any type of computing devices capable of accessing the resource feed(s) 504 and/or the SaaS application(s) 508, and may, for example, include a variety of desktop or laptop computers, smartphones, tablets, etc. The resource feed(s) 504 may include any of numerous resource types and may be provided from any of numerous locations. In some embodiments, for example, the resource feed(s) 504 may include one or more systems or services for providing virtual applications and/or desktops to the client(s) 202, one or more file repositories and/or file sharing systems, one or more secure browser services, one or more access control services for the SaaS applications 508, one or more management services for local applications on the client(s) 202, one or more internet enabled devices or sensors, etc. The resource management service(s) 502, the resource feed(s) 504, the gateway service(s) 506, the SaaS application(s) 508, and the identity provider 510 may be located within an on-premises data center of an organization for which the multi-resource access system 500 is deployed, within one or more cloud computing environments, or elsewhere.

FIG. 5B is a block diagram showing an example implementation of the multi-resource access system 500 shown in FIG. 5A in which various resource management services 502 as well as a gateway service 506 are located within a cloud computing environment 512. The cloud computing environment may, for example, include Microsoft Azure Cloud, Amazon Web Services, Google Cloud, or IBM Cloud. It should be appreciated, however, that in other implementations, one or more (or all) of the components of the resource management services 502 and/or the gateway service 506 may alternatively be located outside the cloud computing environment 512, such as within a data center hosted by an organization.

For any of the illustrated components (other than the client 202) that are not based within the cloud computing environment 512, cloud connectors (not shown in FIG. 5B) may be used to interface those components with the cloud computing environment 512. Such cloud connectors may, for example, run on Windows Server instances and/or Linux Server instances hosted in resource locations and may create a reverse proxy to route traffic between those resource locations and the cloud computing environment 512. In the illustrated example, the cloud-based resource management services 502 include a client interface service 514, an identity service 516, a resource feed service 518, and a single sign-on service 520. As shown, in some embodiments, the client 202 may use a resource access application 522 to communicate with the client interface service 514 as well as to present a user interface on the client 202 that a user 524 can operate to access the resource feed(s) 504 and/or the SaaS application(s) 508. The resource access application 522 may either be installed on the client 202, or may be executed by the client interface service 514 (or elsewhere in the multi-resource access system 500) and accessed using a web browser (not shown in FIG. 5B) on the client 202.

As explained in more detail below, in some embodiments, the resource access application 522 and associated components may provide the user 524 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 522 is launched or otherwise accessed by the user 524, the client interface service 514 may send a sign-on request to the identity service 516. In some embodiments, the identity provider 510 may be located on the premises of the organization for which the multi-resource access system 500 is deployed. The identity provider 510 may, for example, correspond to an on-premises Windows Active Directory. In such embodiments, the identity provider 510 may be connected to the cloud-based identity service 516 using a cloud connector (not shown in FIG. 5B), as described above. Upon receiving a sign-on request, the identity service 516 may cause the resource access application 522 (via the client interface service 514) to prompt the user 524 for the user's authentication credentials (e.g., username and password). Upon receiving the user's authentication credentials, the client interface service 514 may pass the credentials along to the identity service 516, and the identity service 516 may, in turn, forward them to the identity provider 510 for authentication, for example, by comparing them against an Active Directory domain. Once the identity service 516 receives confirmation from the identity provider 510 that the user's identity has been properly authenticated, the client interface service 514 may send a request to the resource feed service 518 for a list of subscribed resources for the user 524.

In other embodiments (not illustrated in FIG. 5B), the identity provider 510 may be a cloud-based identity service, such as a Microsoft Azure Active Directory. In such embodiments, upon receiving a sign-on request from the client interface service 514, the identity service 516 may, via the client interface service 514, cause the client 202 to be redirected to the cloud-based identity service to complete an authentication process. The cloud-based identity service may then cause the client 202 to prompt the user 524 to enter the user's authentication credentials. Upon determining the user's identity has been properly authenticated, the cloud-based identity service may send a message to the resource access application 522 indicating the authentication attempt was successful, and the resource access application 522 may then inform the client interface service 514 of the successfully authentication. Once the identity service 516 receives confirmation from the client interface service 514 that the user's identity has been properly authenticated, the client interface service 514 may send a request to the resource feed service 518 for a list of subscribed resources for the user 524.

The resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities. The resource feed service 518 may then aggregate all items from the different feeds and forward them to the client interface service 514, which may cause the resource access application 522 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 508 to which the user 524 has subscribed. The lists of local applications and the SaaS applications 508 may, for example, be supplied by resource feeds 504 for respective services that manage which such applications are to be made available to the user 524 via the resource access application 522. Examples of SaaS applications 508 that may be managed and accessed as described herein include Microsoft Office 365 applications, SAP SaaS applications, Workday applications, etc.

For resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 202 may proceed to access the selected resource.

When the user 524 selects a local application, the resource access application 522 may cause the selected local application to launch on the client 202. When the user 524 selects a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522. The client 202 may then launch the identified browser and initiate a connection to the gateway service 506. The gateway service 506 may then request an assertion from the single sign-on service 520. Upon receiving the assertion, the gateway service 506 may cause the identified browser on the client 202 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 202 to access the selected SaaS application 508.

In some embodiments, the preferred browser identified by the gateway service 506 may be a specialized browser embedded in the resource access application 522 (when the resource application is installed on the client 202) or provided by one of the resource feeds 504 (when the resource access application 522 is located remotely), e.g., via a secure browser service. In such embodiments, the SaaS applications 508 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 504) for assessment of its security risk by a web filtering service. For approved URLs, the specialized browser may be permitted to access the link. For suspicious links, however, the web filtering service may have the client interface service 514 send the link to a secure browser service, which may start a new virtual browser session with the client 202, and thus allow the user to access the potentially harmful linked content in a safe environment.

In some embodiments, in addition to or in lieu of providing the user 524 with a list of resources that are available to be accessed individually, as described above, the user 524 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 524 of something that requires the user's attention (e.g., approval of an expense report, new course available for registration, etc.).

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box 526 labeled "systems of record," and further in which several different services are included within the resource management services block 502. As explained below, the services shown in FIG. 5C may enable the provision of a streamlined resource activity feed and/or notification process for a client 202. In the example shown, in addition to the client interface service 514 discussed above, the illustrated services include a microapp service 528, a data integration provider service 530, a credential wallet service 532, an active data cache service 534, an analytics service 536, and a notification service 538. In various embodiments, the services shown in FIG. 5C may be employed either in addition to or instead of the different services shown in FIG. 5B. Further, as noted above in connection with FIG. 5B, it should be appreciated that, in other implementations, one or more (or all) of the components of the resource management services 502 shown in FIG. 5C may alternatively be located outside the cloud computing environment 512, such as within a data center hosted by an organization.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 522 without having to launch the native application. The system shown in FIG. 5C may, for example, aggregate relevant notifications, tasks, and insights, and thereby give the user 524 a dynamic productivity tool. In some embodiments, the resource activity feed may be intelligently populated by utilizing machine learning and artificial intelligence (AI) algorithms. Further, in some implementations, microapps may be configured within the cloud computing environment 512, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 5C, the systems of record 526 may represent the applications and/or other resources the resource management services 502 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 502, and in particular the data integration provider service 530, may, for example, support REST API, JSON, OData-JSON, and XML. As explained in more detail below, the data integration provider service 530 may also write back to the systems of record, for example, using OAuth2 or a service account.

In some embodiments, the microapp service 528 may be a single-tenant service responsible for creating the microapps. The microapp service 528 may send raw events, pulled from the systems of record 526, to the analytics service 536 for processing. The microapp service may, for example, periodically pull active data from the systems of record 526.

In some embodiments, the active data cache service 534 may be single-tenant and may store all configuration information and microapp data. It may, for example, utilize a per-tenant database encryption key and per-tenant database credentials.

In some embodiments, the credential wallet service 532 may store encrypted service credentials for the systems of record 526 and user OAuth2 tokens.

In some embodiments, the data integration provider service 530 may interact with the systems of record 526 to decrypt end-user credentials and write back actions to the systems of record 526 under the identity of the end-user. The write-back actions may, for example, utilize a user's actual account to ensure all actions performed are compliant with data policies of the application or other resource being interacted with.

In some embodiments, the analytics service 536 may process the raw events received from the microapps service 528 to create targeted scored notifications and send such notifications to the notification service 538.

Finally, in some embodiments, the notification service 538 may process any notifications it receives from the analytics service 536. In some implementations, the notification service 538 may store the notifications in a database to be later served in an activity feed. In other embodiments, the notification service 538 may additionally or alternatively send the notifications out immediately to the client 202 as a push notification to the user 524.

In some embodiments, a process for synchronizing with the systems of record 526 and generating notifications may operate as follows. The microapp service 528 may retrieve encrypted service account credentials for the systems of record 526 from the credential wallet service 532 and request a sync with the data integration provider service 530. The data integration provider service 530 may then decrypt the service account credentials and use those credentials to retrieve data from the systems of record 526. The data integration provider service 530 may then stream the retrieved data to the microapp service 528. The microapp service 528 may store the received systems of record data in the active data cache service 534 and also send raw events to the analytics service 536. The analytics service 536 may create targeted scored notifications and send such notifications to the notification service 538. The notification service 538 may store the notifications in a database to be later served in an activity feed and/or may send the notifications out immediately to the client 202 as a push notification to the user 524.

In some embodiments, a process for processing a user-initiated action via a microapp may operate as follows. The client 202 may receive data from the microapp service 528 (via the client interface service 514) to render information corresponding to the microapp. The microapp service 528 may receive data from the active data cache service 534 to support that rendering. The user 524 may invoke an action from the microapp, causing the resource access application 522 to send an action request to the microapp service 528 (via the client interface service 514). The microapp service 528 may then retrieve from the credential wallet service 532 an encrypted Oauth2 token for the system of record for which the action is to be invoked, and may send the action to the data integration provider service 530 together with the encrypted OAuth2 token. The data integration provider service 530 may then decrypt the OAuth2 token and write the action to the appropriate system of record under the identity of the user 524. The data integration provider service 530 may then read back changed data from the written-to system of record and send that changed data to the microapp service 528. The microapp service 528 may then update the active data cache service 534 with the updated data and cause a message to be sent to the resource access application 522 (via the client interface service 514) notifying the user 524 that the action was successfully completed.

In some embodiments, in addition to or in lieu of the functionality described above, the resource management services 502 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 502 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 502 may, for example, parse these requests and respond because they are integrated with multiple systems on the back-end. In some embodiments, users may be able to interact with the virtual assistant through either the resource access application 522 or directly from another resource, such as Microsoft Teams. This feature may allow employees to work efficiently, stay organized, and deliver only the specific information they're looking for.

FIG. 5D shows how a display screen 540 presented by a resource access application 522 (shown in FIG. 5C) may appear when an intelligent activity feed feature is employed and a user is logged on to the system. Such a screen may be provided, for example, when the user clicks on or otherwise selects a "home" user interface element 542. As shown, an activity feed 544 may be presented on the screen 540 that includes a plurality of notifications 546 about respective events that occurred within various applications to which the user has access rights. An example implementation of a system capable of providing an activity feed 544 like that shown is described above in connection with FIG. 5C. As explained above, a user's authentication credentials may be used to gain access to various systems of record (e.g., SalesForce, Ariba, Concur, RightSignature, etc.) with which the user has accounts, and events that occur within such systems of record may be evaluated to generate notifications 546 to the user concerning actions that the user can take relating to such events. As shown in FIG. 5D, in some implementations, the notifications 546 may include a title 560 and a body 562, and may also include a logo 564 and/or a name 566 of the system or record to which the notification 546 corresponds, thus helping the user understand the proper context with which to decide how best to respond to the notification 546. In some implementations, one or more filters may be used to control the types, date ranges, etc., of the notifications 546 that are presented in the activity feed 544. The filters that can be used for this purpose may be revealed, for example, by clicking on or otherwise selecting the "show filters" user interface element 568. Further, in some embodiments, a user interface element 570 may additionally or alternatively be employed to select a manner in which the notifications 546 are sorted within the activity feed. In some implementations, for example, the notifications 546 may be sorted in accordance with the "date and time" they were created (as shown for the element 570 in FIG. 5D), a "relevancy" mode (not illustrated) may be selected (e.g., using the element 570) in which the notifications may be sorted based on relevancy scores assigned to them by the analytics service 536, and/or an "application" mode (not illustrated) may be selected (e.g., using the element 570) in which the notifications 546 may be sorted by application type.

When presented with such an activity feed 544, the user may respond to the notifications 546 by clicking on or otherwise selecting a corresponding action element 548 (e.g., "Approve," "Reject," "Open," "Like," "Submit," etc.), or else by dismissing the notification, e.g., by clicking on or otherwise selecting a "close" element 550. As explained in connection with FIG. 5C below, the notifications 546 and corresponding action elements 548 may be implemented, for example, using "microapps" that can read and/or write data to systems of record using application programming interface (API) functions or the like, rather than by performing full launches of the applications for such systems of record. In some implementations, a user may additionally or alternatively view additional details concerning the event that triggered the notification and/or may access additional functionality enabled by the microapp corresponding to the notification 546 (e.g., in a separate, pop-up window corresponding to the microapp) by clicking on or otherwise selecting a portion of the notification 546 other than one of the user-interface elements 548, 550. In some embodiments, the user may additionally or alternatively be able to select a user interface element either within the notification 546 or within a separate window corresponding to the microapp that allows the user to launch the native application to which the notification relates and respond to the event that prompted the notification via that native application rather than via the microapp. In addition to the event-driven actions accessible via the action elements 548 in the notifications 546, a user may alternatively initiate microapp actions by selecting a desired action, e.g., via a drop-down menu accessible using the "action" user-interface element 552 or by selecting a desired action from a list 554 of recently and/or commonly used microapp actions. As shown, additional resources may also be accessed through the screen 540 by clicking on or otherwise selecting one or more other user interface elements that may be presented on the screen. For example, in some embodiments, the user may also access files (e.g., via a Citrix ShareFile™ platform) by selecting a desired file, e.g., via a drop-down menu accessible using the "files" user interface element 556 or by selecting a desired file from a list 558 of recently and/or commonly used files. Further, in some embodiments, one or more applications may additionally or alternatively be accessible (e.g., via a Citrix Virtual Apps and Desktops™ service) by clicking on or otherwise selecting an "apps" user-interface element 572 to reveal a list of accessible applications or by selecting a desired application from a list (not shown in FIG. 5D but similar to the list 558) of recently and/or commonly used applications. And still further, in some implementations, one or more desktops may additionally or alternatively be accessed (e.g., via a Citrix Virtual Apps and Desktops™ service) by clicking on or otherwise selecting a "desktops" user-interface element 574 to reveal a list of accessible desktops or by or by selecting a desired desktop from a list (not shown in FIG. 5D but similar to the list 558) of recently and/or commonly used desktops.

The activity feed shown in FIG. 5D provides significant benefits, as it allows a user to respond to application-specific events generated by disparate systems of record without needing to navigate to, launch, and interface with multiple different native applications.

F. Detailed Description of Example Embodiments of the Bootstrapped Relevance Scoring System Introduced in Section A A key approach in achieving intelligent automation in a digital workspace, such as that provided by the multi-resource access system 500, is by incrementally and continuously learning from knowledge worker interactions and behavior within the workspace, often with the help of advanced machine learning or deep learning techniques. For instance, in a digital workspace environment entailing an individualized feed that summarizes informative and actionable entries for the knowledge worker to review (e.g., the notifications 546 in the activity feed 544 shown in FIG. 5D), profiled past interactions of the worker with the feed can be funneled to predictive machine learning models that infer the relevance of each entry to the worker, often on an individualized basis. In turn, such relevance scores can be used to achieve productivity gains, e.g., by ranking a plurality of entries to reflect order of priority to the business and/or adapt the delivery time based on context (e.g. status mobility) and criticality, among others. With such a feed (e.g., the activity feed 544) being one example of the use of the bootstrapped relevance scoring system 100 described herein, its practical use and value permeates other facets of a digital workspace, such as in content recommendation, in pro-active resource allocation for faster startup/guaranteed quality of service of applications/desktops and others.

Intelligent automation as a whole, and particularly based on relevance, is ultimately data-driven. As such, the availability of high quality user interaction data and in high volumes can be important for value monetization, on a per user basis. Else said, there may be a significant time gap from the time a new user joins a digital workspace until there is enough user behavior data collected for the user to start reaping the benefits of intelligent automation features. Until then, user experience in the digital workspace may be—from an intelligent automation perspective—degraded. Overall, this can put sustained new user acquisition at risk and can adversely prolong the time-to-value and reduce the return on automation investment rate. Note that this problem does not manifest itself only in the case of fresh digital workspace roll-outs (either from scratch or in waved roll-outs), but also as new employees join an enterprise that uses a digital workspace or also in case employee windowed data volume falls below an acceptable threshold (e.g. in the case of prolonged leave events or change of departments).

The user similarity matching service 102 of the system 100 disclosed herein addresses this problem by facilitating a data-driven intelligent automation experience for new users and/or relatively inactive users in a digital workspace. In doing so, the anticipated value proposition relative to the current situation lies with seamless user experience to the full of the intelligent automation investment, right from the start, and with that, faster user adoption and retention rates.

As described in Section E above (with reference to FIGS. 5C and 5D), in some implementations, the microapp service 528 of the multi-resource access system 500 may periodically pull raw data from the systems of record 526 and send that raw data to the analytics service 536 for processing. The analytics service 536 may then process the raw events received from the microapps service 528 to create targeted scored notifications and send such notifications to the notification service 538 for distribution to individual users 524. In some implementations, the bootstrapped relevance scoring system 100 may thus be advantageously included within, or operate in conjunction, with the analytics service 536 described above in connection with FIG. 5C, so as to facilitate the determination of relevance scores for the notifications 546 of new/passive users in accordance with the present disclosure.

With reference to FIG. 1, the "user feed inventory" storage medium 112 may, for example, comprise one or more databases or other data stores that hold notifications 546 for a particular user 524. Such notifications 546 may, for example, include application notifications (informational or actionable) initiated by changes made in one or more of the systems of record 526. It is not uncommon for users to be subscribed to a sub-set of all applications available within a digital workspace, e.g., by reflection of the user's role/function, mapping to organizational chart/department, project/team participations, professional interests and other factors.

In some implementations, the notifications 546 may additionally or alternatively include broadcast messages users 524 share with some or all employees within the same organization and/or content (files, video, photos, etc.) that users 524 share or re-share, either to other individual users or to designated groups of users. It should be appreciated that records in the "user feed inventory" storage medium 112 may correspond to (A) notifications 546 that are yet to be seen and/or actioned by a user, e.g., notifications 546 that are still present in the user's activity feed 544, and/or (B) notifications 546 that have been removed from the user's activity feed 544 (e.g., due to the notification 546 having been actioned/reviewed, due to system-level expiration of notification 546, etc.). The latter "historical" set, while not anymore presented to the user, is part of understanding past user interaction patterns with the activity feed 544 and may therefore be kept in the storage medium 112 to train relevance scoring models based on past user behavior.

The "user behavior data" storage medium 104 may include one or more databases or other data stores that hold per user telemetry received, for example, as a result of horizontal product instrumentation, whereby each telemetry event may convey user/system information that may be relevant to inferring per user relevance preferences/user intent. A non-exhaustive list of such data points comprises: (A) type and mass of user interactions by system of record 526, (B) type and mass of user interactions with non-actionable notifications 546, (C) type and mass of user interactions with actionable notifications 546, (D) type and mass of user interactions by notification source type (e.g., system of record generated, re-shared post, broadcast, etc.), (E) type of device in use (e.g., mobile, stationary, etc.), (F) time of the day, day of the week, etc., (G) originator of broadcast notifications 546, (H) cumulative session duration at the time of each user interaction.

The "user profile data" storage medium 118 may include one or more databases or other data stores that hold long-standing information that is known about the users 524. Such information may, for example, include user preferences that the user or its product representative (e.g. an administrator) explicitly configured. A non-exhaustive list of such user preferences comprises (A) static relevance rankings to be applied to notifications 546 by system of record 526, recipient types (personal/group) etc., (B) permanent or windowed muting preferences of notifications 546 by system of record 526, source type (e.g., mute re-shared notifications from a specific user/group), etc., and (C) lists of applications to which the users 524 are subscribed.

Further, and of particular relevance to the present disclosure, the "user profile data" storage medium 118 may also hold long-standing identity information about the users 524 within an organization. A non-exhaustive list of types of such identity information comprises (A) roles/functions of the users 524, (B) groups/divisions/departments that the users 524 belong to, (C) project/team participation of respective users 524, (D) managers to which the users 524 report, (E) users' branch locations, (F) hiring dates of users 524, and (G) users' years of experience.

The "relevance scoring models" storage medium 106 may include one or more databases or other data stores that hold personalized, trained relevance scoring models for active users. As noted above, such relevance scoring models may, for example, be trained by the model training and selection service 120 based on user-specific data obtained from the "user behavior data" storage medium 104, the "user feed inventory" storage medium 112, and/or the "user profile data" storage medium 118. In particular, in some implementations, user-specific data for active users 524 may be retrieved from one or more of the storage mediums 104, 112, 118, and may be encoded into feature vectors that are used to train one or more predictive machine learning models for such active users 524.

As noted in Section A, the user similarity matching service 102 shown in FIG. 1 may identify one or more active users who share similar user profile characteristics (e.g., stored in the "user profile data" storage medium 118) with a new or passive user, and may (A) transfer one or more relevance scoring models (e.g., stored in the storage medium 106) for a sufficiently similar active user to the new/passive user, and/or (B) may use the historical behavior data for one or more sufficiently similar active users to generate one or more new relevance scoring models for the new/passive user. Thus, at a high level, the user similarity matching service 102 may employ "transfer learning" concepts to (1) group active and passive/new users by means of user similarity metrics, and then (2) for passive users, may re-purpose trained models of active users (or the source data used to generated such trained models) to facilitate relevance scoring for passive users belonging to the same similarity group.

FIG. 6 is a flowchart showing a first example routine 600 that may be executed by the user similarity matching service 102 shown in FIG. 1. In some implementations, the user similarity matching service 102 may be embodied by one or more processors and one or more computer-readable media encoded with instructions which, when executed by the one or more processors, cause a computing system to perform the example routine 600. The computing system embodying the user similarity matching service 102 may, for example, include one or more servers 204 and/or be included within a cloud computing environment 400, as described above in connection with FIGS. 2-4. Further, as noted previously, in some implementations, the bootstrapped relevance scoring system 100 (including the user similarity matching service 102) may be included within, or operate in conjunction with, the analytics service 536 shown in FIG. 5C.

As shown in FIG. 6, the routine 600 may begin at a step 602, at which the user similarity matching service 102 may identify new and/or passive users of the system 100. In some implementations, the user similarity matching service 102 may identify the users registered with the system 100 (e.g., based on the existence of user profiles in the "user profile data" storage medium 118), and may determine whether, for individual users, a sufficient amount of historical data exists in the "user behavior data" storage medium 104 for the model training and selection service 120 to generate a suitable relevance scoring model. In some implementations, for example, the user similarity matching service 102 may determine that a user 524 is new and/or passive if that user has had fewer than a threshold number of interactions with the user's activity feed 544 within a particular window of time in the recent past. In some implementations, the user similarity matching service 102 may further instruct the model training and selection service 120 to remove existing trained models from the "relevance scoring models" storage medium 106 for any users who are determined to be passive, so as to ensure that stale relevance scoring models are not employed for those users.

In other implementations, the user similarity matching service 102 may simply query the "relevance scoring models" storage medium 106 to determine whether it contains trained models for registered users, and may conclude that a given user is new and/or passive if the storage medium lacks a trained model for that user. Such a technique may be effective, for example, in implementations in which the model training and selection service 120 both (A) generates new trained models for users when it determines the users have had more than a threshold number of interactions with the user's activity feed 544 within a particular window of time in the recent past, and (B) removes existing models for users from the storage medium 106 when it determines the users have had fewer than the threshold number of interactions with the user's activity feed 544 within such a time window.

Alternatively, in some implementations, the user similarity matching service 102 may identify new and/or passive users of the system 100 by receiving a list of new and/or passive users from another system component. For example, in some implementations, the user similarity matching service 102 may send a request for a list of new and/or passive users to the model training and selection service 120, and the model training and selection service 120 may perform some or all of the above-described steps and return a list of new and/or passive users to the user similarity matching service 102.

At a decision step 604 of the routine 600, the user similarity matching service 102 may determine whether at least one new and/or passive user was identified at the step 602. When, at the decision step 604, the user similarity matching service 102 determines that at least one new and/or passive user has been identified, the routine 600 may proceed to a step 606. When, on the other hand, the user similarity matching service 102 determines (at the decision step 604) that at least one new and/or passive user has not been identified, the routine 600 may instead simply terminate, as in that case there would be no users who would benefit from the bootstrapping functionality of the system 100 at that point in time.

At the step 606 of the routine 600, the user similarity matching service 102 may identify active users of the system 100 for which a trained model already exists in the "relevance scoring models" storage medium 106. To identify such active users, the user similarity matching service 102 may, in some implementations, identify the users registered with the system 100 (e.g., based on the existence of user profiles in the "user profile data" storage medium 118), and may determine whether, for individual users, a sufficient amount of historical data exists in the "user behavior data" storage medium 104 for the model training and selection service 120 to generate a suitable relevance scoring model. In some implementations, for example, the user similarity matching service 102 may determine that a user 524 is active if that user has had greater than a threshold number of interactions with the user's activity feed 544 within a particular window of time in the recent past. In some implementations, the user similarity matching service 102 may additionally query the storage medium 106 to determine whether trained models exist for such active users. If a user is both active and has a trained model in the storage medium, that user may be identified as an active user having a trained model.

In other implementations, the user similarity matching service 102 may simply query the "relevance scoring models" storage medium 106 to determine whether it contains trained models for registered users, and may conclude that a given user is an active user with a trained model if the storage medium includes a trained model for that user. Such a technique may be effective, for example, in implementations in which the model training and selection service 120 both (A) generates new trained models for users when it determines the users have had more than a threshold number of interactions with the user's activity feed 544 within a particular window of time in the recent past, and (B) removes existing models for users from the storage medium 106 when it determines the users have had fewer than the threshold number of interactions with the user's activity feed 544 within such a time window.

Alternatively, in some implementations, the user similarity matching service 102 may identify active users of the system 100 for which a trained model already exists in the "relevance scoring models" storage medium 106 by receiving a list of such users from another system component. For example, in some implementations, the user similarity matching service 102 may send a request for a list of active users for which a trained model already exists in the storage medium 106 to the model training and selection service 120, and the model training and selection service 120 may perform some or all of the above-described steps and return a list of such users to the user similarity matching service 102.

At a decision step 608 of the routine 600, the user similarity matching service 102 may determine whether the number of active users with trained models (identified at the step 606) is greater than a threshold number. When, at the decision step 604, the user similarity matching service 102 determines that greater than the threshold number of active users with trained models have been identified (at the step 606), the routine 600 may proceed to a step 610. When, on the other hand, the user similarity matching service 102 determines (at the decision step 608) that the number of active users with trained models is below the threshold number, the routine 600 may instead proceed to a step 624, at which the relevance scoring feature for the new and/or passive users identified at the step 602 may be disabled. Such a "disabling" step may be taken, for example, to safeguard the system 100 from using an insufficient amount of information to infer similarity among users, as described below. In some implementations, the system 100 may entirely switch off the relevance scoring intelligence feature for the identified new/passive users, and may resort to a default mode of information presentation, e.g., based on the age of notifications 546, as determined by time stamps or otherwise. In other implementations, the system 100 may instead employ a baseline "heuristic" method to infer coarse-grained relevance scores, e.g., using a weighted formula of notification age, notification type frequency, etc.

Beginning at the step 610 of the routine 600, the user similarity matching service 102 may undertake a process of (A) identifying, for respective ones of the new and/or passive users identified at the step 602, at least one active user (identified at the step 606) who is sufficiently similar to the new/passive user to warrant performing relevance scoring based on that user's historical behavior data, and (B) transferring one or more trained models of identified active user to the new/passive user, and/or generating one or more new trained models using the historical behavior data of (at least) the identified active user.

The inventors have recognized and appreciated that it is possible to identify groups of active users of the system 100 whose group members tend to have similar activity feeds 544 and/or tend to interact with the notifications 546 in their activity feeds 544 in a similar fashion. As such, in some implementations, as an initial step to identify suitable active users whose trained models and/or behavior data can be transferred to new/passive users, the user similarity matching service 102 may evaluate the notification inventory (e.g., from the "user feed inventory" storage medium 112) and/or the historical behavior data (e.g., from the "user behavior data" storage medium 104) of the active users identified at the step 606 to identify "clusters" of those users.

For example, in some implementations, the user similarity matching service 102 may encode various variables/features (e.g., from the "user feed inventory" storage medium 112 and/or the "user behavior data" storage medium 104) for the identified active users into feature vectors, with each such feature vector representing a point (corresponding to an active user) in a multi-dimensional feature space. Once those feature vectors have been determined, the user similarity matching service 102 may use a clustering process to identify a set of clusters of the points within the multi-dimensional feature space. In some implementations, a partitioning clustering process that is capable of decomposing data for active users into a set of disjoint clusters may be employed. Examples of suitable partitioning clustering processes include K-means clustering, K-medoids (or partitioning around medoids (PAM)), and the clustering large applications (CLARA) algorithm. Any of a number of other data clustering techniques, such as density-based spatial clustering of applications with noise (DBSCAN), mean-shift clustering, expectation-maximum (EM) clustering using Gaussian mixture models (GMM), and k-nearest neighbor (KNN) classification, may additionally or alternatively be considered in some implementations.

The feature space for determining clusters of active users may include any of a number of variables/features from the "user feed inventory" storage medium 112 and/or the "user behavior data" storage medium 104 for respective ones of the active users identified at the step 606. Examples of variables/features that may be employed for the respective active users include (A) the number and type of interactions the user has had with notifications 546, (B) the number of notifications 546 the user has received from respective systems of record, (C) the type of device the user was operating, (D) the owners of broadcast notifications and/or re-shared posts in the user's activity feed 544, (E) the number of broadcasted messages in the user's activity feed 544, (F) a total amount of time the user spent on the activity feed 544. It should be appreciated that any or all of the foregoing variables/features may correspond to a limited snapshot of the historical data maintained for the user, for example, by reflecting telemetry data for a particular window of time in the recent past and/or a particular quantity of notifications 546 to most recently be presented in the user's activity feed 544.

The above list of features is exemplary and may optionally include fewer, more, or different features. Further, in some implementations, the identity of the particular clustering features that are employed may be a parameter that is determined by a sub-system, such that the final set of features to be used for the final clustering may be decided by that sub-system, as driven by the feature set that optimizes the clustering termination criterion (e.g., a dimensionality reduction sub-step). Such a dimensionality reduction sub-step may be performed, for example, using either "feature selection" techniques (i.e., selecting a subset of features of the original dataset) or "feature extraction" techniques (i.e., deriving information from the original data set to build a new feature subspace). Examples of suitable "feature selection" techniques include Sequential Backward Selection (SBS) and Random Forests Feature Importance (RFFI) techniques. Employing a feature selection/extraction sub-system, such as described above, may provide various benefits, such as improving the computation efficiency of the clustering process, reducing noise within the data set, avoiding overfitting and reducing the complexity of trained models, etc.

In some implementations, to optimize the clustering of active users by activity feed and/or behavioral similarity, the number of clusters to be generated may be specified, such as by indicating the optimal number of clusters, "K." Since this number can be subjective and may depend on the method used for measuring similarities and the parameters used for partitioning, in some implementations, a more direct method for determining an optimal value of "K" may be used. In some implementations, for example, a particular criterion may be optimized, such as the within cluster sums of squares (e.g., using an "elbow" method) or the average silhouette (e.g., using a "silhouette" method). Such a process of achieving the optimal number of clusters can be seen as a tuning step for the clustering process that is employed.

The final outcome of the step 610 may be a set of "K" well-separated clusters/groups of active users, based on their behavioral/inventory similarity. In order to determine the degree of separation between these clusters and in general to evaluate the quality of the clustering process, one or more additional methods may also be employed, such as Silhouette analysis, Inertia, and Dunn Index. In any event, as a result of the step 610, at least one cluster of active users may be identified.

Pursuant to a step 612 and a decision step 622 of the routine 600, the user similarity matching service 102 may iterate over the new/passive users and attempt to find at least one active user that is sufficiently similar to such new/passive users to warrant performing relevance scoring based on that user's historical behavior data. Although FIG. 6 indicates that processing of the new/passive users occurs serially, with one new/passive user at a time being selected at the step 612, it should be appreciated such processing may instead be performed in parallel.

At a step 614 of the routine 600, the user similarity matching service 102 may compare a new/active user's profile data (e.g., from the "user profile data" storage medium 118) with the profile data of the active users in the clusters identified at the step 610 to attempt to find at least one cluster with which the new/passive user is a good match. Example techniques that may be used to perform such a comparison are described below.

At a decision step 616, the user similarity matching service 102 may determine whether at least one cluster is found to be a good match with the new/passive user. When, at the decision step 616, the user similarity matching service 102 finds at least one cluster that is a good match, the routine 600 may proceed to a step 618, at which the user similarity matching service 102 may identify the cluster that is the best match for the new/passive user. When, on the other hand, the user similarity matching service 102 does not find at least one cluster that is a good match, the routine 600 may instead proceed to a step 626, at which the relevance scoring feature (provided by the relevance scoring service 108) may be disabled for the new/passive user being evaluated (i.e., the particular new/passive user that was selected at the step 612). In some implementations, the system 100 may entirely switch off the relevance scoring intelligence feature for the selected new/passive user, and may resort to a default mode of information presentation, e.g., based on the age of notifications 546, as determined by time stamps or otherwise. In other implementations, the system 100 may instead employ a baseline "heuristic" method to infer coarse-grained relevance scores, e.g., using a weighted formula of notification age, notification type frequency, etc.

With respect to the comparison performed at the step 614, the inventors have recognized and appreciated that employees who belong to the same group/division/department may receive more or less the same or similar types of notifications 546 in their activity feeds 544. The inventors have further recognized and appreciated that users with same business objectives and roles (e.g., by job function, team/project participation, years of experience, etc.) are likely to exhibit similar usage patterns in terms of how they interact with the notifications 546 in their activity feeds 544. As noted above, information reflecting such user identity features (e.g., user group/division/department, job function, team/project participation, years of experience, etc.) may be stored on a per employee/user basis in the "user profile data" storage medium 118. As such, in some implementations, the user similarity matching service 102 may use that available set of identity features to build similarity metrics for the purpose of comparing the new/passive users (identified at the step 602) to respective ones of the clusters of active users (determined at the step 610).

In some implementations, in addition to or in lieu of building similarity metrics using identity features, the user similarity matching service 102 may build similarity metrics using application subscription preferences of respective users (e.g., from the "user profile data" storage medium 118). Such an approach may be useful, for example, in implementations in which the set of applications (e.g., systems of record 526) differs significantly on the basis of user business/organizational characteristics.

The similarity metrics used to compare new/passive users to respective clusters based on identify features and/or subscription preferences (e.g., from the "user profile data" storage medium 118) may take on any of a number of forms. In some implementations, for example, for a given user, the user similarity matching service 102 may create a tabular row structure of categorical features, whereby respective categorical features (or fields) may be assigned corresponding values for that user. As one example, a categorical field/value pair may be "Department:Engineering". In some implementations, such a tabular row structure may be instantiated for respective ones of the users identified at the steps 602 and 606, either new/passive or active, based on the above description.

Further, in some implementations, the user similarity matching service 102 may build identity/preference profiles for respective clusters of active users (e.g., as determined at the step 610). For example, in some implementations, for a given cluster, the value of a categorical identity feature (e.g. "department") may be set by applying majority voting among the same feature values of the active users in that same cluster. Further, in some implementations, such a majority voting technique may optionally employ a weighing process whereby the votes of respective users to decide the feature value of the centroid may be proportional to the distance of those users from the cluster centroid. By employing such an approach iteratively for the identity/preference features indicated in the tabular row structure, the user similarity matching service 102 may determine, for a given cluster, a set of feature values representing the centroid of that cluster. Such a set of feature values may be considered to represent a "central" user of the cluster, from an identity/preference perspective. The user similarity matching service 102 may determine such "central" sets of feature values for the respective clusters that were found pursuant to the step 610.

In some implementations, the comparison performed at the step 614 may involve determining scores representing a number of categorical features that match between a set of feature values for the new/passive user and the "central" sets of feature values for the respective clusters. In such implementations, the decision step 616 may involve determining whether at least one such score exceeds a threshold value, and the step 618 may involve selecting the cluster for which the score (determined at the step 610) is the highest. In situations in which two or more clusters receive the same score, random selection may be employed to select one of the clusters.

At a step 620 of the routine 600, the user similarity matching service 102 may either transfer the model of one of the users in the identified cluster (determined at the step 618) to the new/passive user, or use data of one or more users in the identified cluster to generate a new trained model for the new/passive user. In implementations in which an existing trained model is transferred to the new/passive user, the user similarity matching service 102 may, for example, select the active user that is closest to the centroid of the cluster to which the new/passive user has been matched (per the step 618), and may then instruct the relevance scoring service 108 to use that trained model (from the "relevance scoring model(s)" storage medium 106) to score notifications 546 that are to be included in the new/passive user's activity feed 544.

In implementations in which a new model is trained for the new/passive user, data for two or more active users in the identified cluster (determined at the step 618) may be used to train a new relevance scoring model for the new/passive user. For example, in some implementations, the user similarity matching service 102 may identify two or more active users in the cluster that have user profiles that most closely resemble the user profile new/passive user, and may then instruct the model training and selection service 120 to generate a new relevance scoring model for the new passive user based on data (e.g., activity feed data from the "user feed inventory" storage medium 112, behavior data from the "user behavior data" storage medium 104, and/or identify features and/or application preference data from the "user profile data" storage medium 118) for the identified active users. In some implementations, for example, the user similarity matching service 102 may select the "N" active users closest to the centroid of the cluster identified at the step 618 ("N" may be even equal to the cluster size), and may then use data for those users as an input feature dataset to train a new relevance scoring model for the new/passive user.

As noted above, the process of the steps 612, 614, 616, 618, 620, 622, and 626 may continue until the user similarity matching service 102 has determined (at the decision step 622) that no new/passive users (identified at the step 602) remain to be processed.

Figure 7:
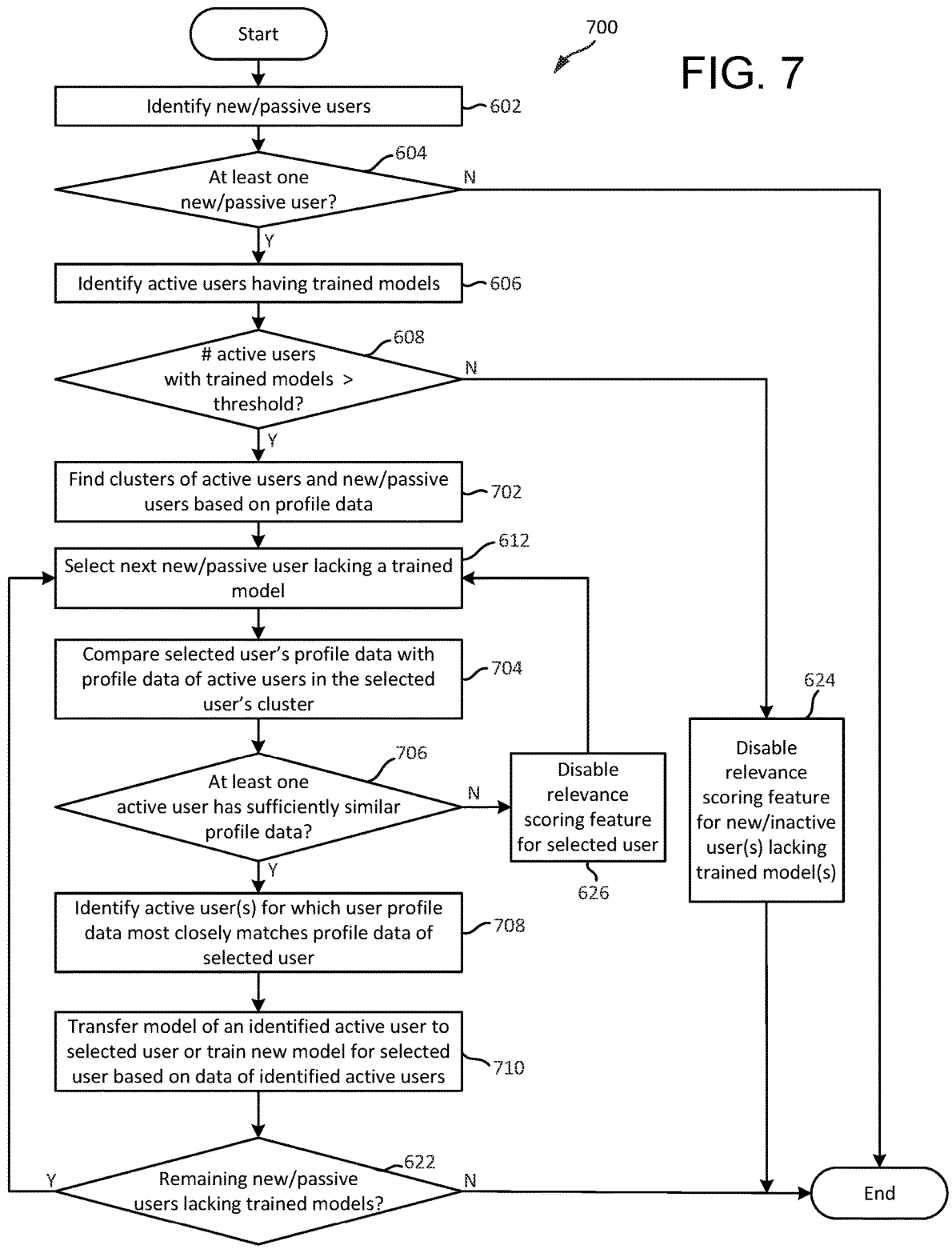
FIG. 7 is a flowchart showing a second example routine that may be performed by the user similarity matching service of the bootstrapped relevance scoring system shown in FIG. 1.

FIG. 7 shows a second example routine 700 that the user similarity matching service 102 may perform in accordance with some embodiments of the present disclosure. The routine 700 is similar to the routine 600 in many respects, and accordingly shares a number of common steps with the routine 600. Those common steps are designated using the same reference numerals as are used in FIG. 6. As those common steps may be performed identically in the routines 600 and 700, for the sake of simplicity and brevity, they will not be described again here.

The first difference between the routines 600 and 700 appears at a step 702 of the routine 700 (shown in FIG. 7). That is, rather than finding clusters of active users based on behavior data (as is the case with the step 610 the routine 600), at the step 702, the user similarity matching service 102 may perform a joint clustering of the active users identified at the step 606 and the new/passive users identified at the step 602, such that the resulting clusters will comprise both active users and new/passive users. The clustering may be performed using the same techniques and details as outlined above in connection with the step 610. However, instead of using behavior data as a feature set to undertake the clustering, at the step 702, the clustering may be performed based on the identity preferences and/or application subscription features (both already described extensively above). In other words, the result of the step 702 is a set of one or more clusters, whereby members (both active users and new/passive users) of respective clusters exhibit similarity with respect to their identity/subscription features.

The next significant difference between the routines 600 and 700 appears at a step 704 of the routine 700. In particular, rather than comparing the selected new/passive user's profile data with the profile data of users in respective clusters (as is the case with the step 614 of the routine 600), at the step 704, the user similarity matching service 102 may compare the selected new/passive user's profile data with the profile data of the active users in the same cluster as the selected new/passive user.

Similar to the step 614, in some implementations, the comparison performed at the step 704 may involve creating, for respective ones of the users identified at the steps 602 and 606, either new/passive users or active users, a tabular row structure of categorical features, whereby respective categorical features (or fields) may be assigned corresponding values for that user. The categorical features for the selected new/passive user may then be compared with the corresponding categorical features for the active users in the same cluster as the selected new/passive user. The user similarity matching service 102 may, for example, determine scores representing the numbers of categorical features that match between the set of feature values for the new/passive user and the various active users in the same cluster as the new/passive user. In such implementations, a decision step 706 (at which the user similarity matching service 102 may determine whether at least one of the active users in the same cluster as the new/passive user has profile data that is sufficiently similar to the new/passive user) may involve determining whether at least one such score exceeds a threshold value. Also in such implementations, at a step 708 (at which the user similarity matching service 102 may identify one or more active users in the same cluster as the passive user who have profile data that most closely matches the new/passive user) may involve selecting the active users in the same cluster as the new/passive user for which the score (determined at the step 704) is the highest. In situations in which two or more active users receive the same score, random selection may be employed to select one of those active users.

At a step 710 of the routine 700, the user similarity matching service 102 may either transfer to the new/passive user a trained model for the most closely matched active user in the same cluster as the passive user (as determined at the step 708), or train a new relevance scoring model for the new/passive user based on data of two of more of the active users identified at the step 708. In implementations in which an existing trained model is transferred to the new/passive user, the user similarity matching service 102 may, for example, instruct the relevance scoring service 108 to use the trained model (from the "relevance scoring model(s)" storage medium 106) of the active user that most closely matches new/passive user to score notifications 546 that are to be included in the new/passive user's activity feed 544.

In implementations in which a new model is trained for the new/passive user, data for two or more active users in the same cluster as the new/passive user (determined at the step 708) may be used to train a new relevance scoring model for the new/passive user. For example, in some implementations, the user similarity matching service 102 may identify two or more active users in the same cluster as the new/passive user, and may then instruct the model training and selection service 120 to generate a new relevance scoring model for the new passive user based on data (e.g., activity feed data from the "user feed inventory" storage medium 112, behavior data from the "user behavior data" storage medium 104, and/or identify features and/or application preference data from the "user profile data" storage medium 118) for the identified users. In some implementations, for example, the user similarity matching service 102 may select the "N" active users that are closest to the new/passive user in the cluster, and may then use data for those active users as an input feature dataset to train a new model for the new/passive user.

In implementations in which all of the active users in the same cluster as the new/passive user are used to train a new relevance scoring model for the new/passive user (i.e., where the number of active users in the same cluster as the new/passive user is equal to "N"), the step 708 need not be employed.

Similar to the routine 600, in the routine 700, the process of the steps 612, 704, 706, 708, 710, 622, and 626 may continue until the user similarity matching service 102 determines (at the step 622) that no new/passive users (identified at the step 602) remain to be processed. Although FIG. 7 indicates that processing of the new/passive users occurs serially, with one new/passive user at a time being selected at the step 612, it should be appreciated such processing may instead be performed in parallel.

G. Example Implementations of Methods, Systems, and Computer-Readable Media in Accordance with the Present Disclosure The following paragraphs (M1) through (M7) describe examples of methods that may be implemented in accordance with the present disclosure.

(M1) A method may be performed that involves determining, by a computing system, that first user profile data of a first user of a relevance scoring service is similar to second user profile data of a second user of the relevance scoring service, the relevance scoring service being configured to assign first relevance scores to first information chunks to be presented to the first user based at least part on at least a first portion of first stored behavior data of the first user, the first stored behavior data being indicative of the first user's interactions with second information chunks previously presented to the first user; and in response to determining that the first user profile data is similar to the second user profile data, configuring the relevance scoring service to assign second relevance scores to third information chunks to be presented to the second user based at least in part on at least a second portion of the first stored behavior data.

(M2) A method may be performed as described in paragraph (M1), and may further involve using at least the first portion of the first stored behavior data to train a first relevance scoring model to assign the first relevance scores to the first information chunks.

(M3) A method may be performed as described in paragraph (M1) or paragraph (M2), wherein configuring the relevance scoring service to assign the second relevance scores to the third information chunks may further involve causing the relevance scoring service to use the first relevance scoring model to assign the second relevance scores to the third information chunks.

(M4) A method may be performed as described in paragraph (M1) or paragraph (M2), wherein configuring the relevance scoring service to assign the second relevance scores to the third information chunks may further involve using at least the second portion of the first stored behavior data to train a second relevance scoring model to assign the second relevance scores to the third information chunks.

(M5) A method may be performed as described in any of paragraphs (M1) through (M4), and may further involve detecting, by the computing system, events of one or more applications to which the second user has access rights; and generating, by the computing system, notifications concerning the detected events; wherein the third information chunks may comprise the notifications.

(M6) A method may be performed as described in any of paragraphs (M1) through (M5), and may further involve encoding second stored behavior data of a plurality of users into feature vectors corresponding to respective ones of the plurality of users; determining one or more clusters of the feature vectors; and determining, for respective ones of the one or more clusters, cluster-specific profile data, the cluster-specific profile data for the respective clusters being based on user profile data of the users whose feature vectors are included in those clusters; wherein determining that the first user profile data is similar to the second user profile data may further involve identifying a first cluster of the one or more clusters that has cluster-specific profile data that most closely resembles the second user profile data of the second user, and wherein a first feature vector for the first user may be included in the first cluster.

(M7) A method may be performed as described in any of paragraphs (M1) through (M6), and may further involve encoding stored user profile data of a plurality of users into feature vectors corresponding to respective ones of the plurality of users, the feature vectors including a first feature vector for the first user and a second feature vector for the second user; and determining one or more clusters of the feature vectors; wherein determining that the first user profile data is similar to the second user profile data may further involve determining that the first feature vector is included in a same cluster as the second feature vector.

The following paragraphs (S1) through (S7) describe examples of systems and devices that may be implemented in accordance with the present disclosure.

(S1) A system may comprise at least one processor and at least one computer-readable medium encoded with instructions which, when executed by the at least one processor, cause the system to determine that first user profile data of a first user of a relevance scoring service is similar to second user profile data of a second user of the relevance scoring service, the relevance scoring service being configured to assign first relevance scores to first information chunks to be presented to the first user based at least part on at least a first portion of first stored behavior data of the first user, the first stored behavior data being indicative of the first user's interactions with second information chunks previously presented to the first user, and, in response to determining that the first user profile data is similar to the second user profile data, to configure the relevance scoring service to assign second relevance scores to third information chunks to be presented to the second user based at least in part on at least a second portion of the first stored behavior data.

(S2) A system may be configured as described in paragraph (S1), and the at least one computer-readable medium may be further encoded with additional instructions which, when executed by the at least one processor, further cause the system to use at least the first portion of the first stored behavior data to train a first relevance scoring model to assign the first relevance scores to the first information chunks.

(S3) A system may be configured as described in paragraph (S1) or paragraph (S2), and the at least one computer-readable medium may be further encoded with additional instructions which, when executed by the at least one processor, further cause the system to configure the relevance scoring service to assign the second relevance scores to the third information chunks at least in part by causing the relevance scoring service to use the first relevance scoring model to assign the second relevance scores to the third information chunks.

(S4) A system may be configured as described in paragraph (S1) or paragraph (S2), and the at least one computer-readable medium may be further encoded with additional instructions which, when executed by the at least one processor, further cause the system to configure the relevance scoring service to assign the second relevance scores to the third information chunks at least in part by using at least the second portion of the first stored behavior data to train a second relevance scoring model to assign the second relevance scores to the third information chunks.

(S5) A system may be configured as described in any of paragraphs (S1) through (S4), and the at least one computer-readable medium may be further encoded with additional instructions which, when executed by the at least one processor, further cause the system to detect events of one or more applications to which the second user has access rights, and to generate notifications concerning the detected events; wherein the third information chunks may comprise the notifications.

(S6) A system may be configured as described in any of paragraphs (S1) through (S5), and the at least one computer-readable medium may be further encoded with additional instructions which, when executed by the at least one processor, further cause the system to encode second stored behavior data of a plurality of users into feature vectors corresponding to respective ones of the plurality of users; determining one or more clusters of the feature vectors, to determine, for respective ones of the one or more clusters, cluster-specific profile data, the cluster-specific profile data for the respective clusters being based on user profile data of the users whose feature vectors are included in those clusters, and to determine that the first user profile data is similar to the second user profile data at least in part by identifying a first cluster of the one or more clusters that has cluster-specific profile data that most closely resembles the second user profile data of the second user, and wherein a first feature vector for the first user may be included in the first cluster.

(S7) A system may be configured as described in any of paragraphs (S1) through (S6), and the at least one computer-readable medium may be further encoded with additional instructions which, when executed by the at least one processor, further cause the system to encode stored user profile data of a plurality of users into feature vectors corresponding to respective ones of the plurality of users, the feature vectors including a first feature vector for the first user and a second feature vector for the second user, to determine one or more clusters of the feature vectors, and to determine that the first user profile data is similar to the second user profile data at least in part by determining that the first feature vector is included in a same cluster as the second feature vector.

The following paragraphs (CRM1) through (CRM7) describe examples of computer-readable media that may be implemented in accordance with the present disclosure.

(CRM1) At least one non-transitory, computer-readable medium may be encoded with instructions which, when executed by at least one processor included in a computing system, cause the computing system to determine that first user profile data of a first user of a relevance scoring service is similar to second user profile data of a second user of the relevance scoring service, the relevance scoring service being configured to assign first relevance scores to first information chunks to be presented to the first user based at least part on at least a first portion of first stored behavior data of the first user, the first stored behavior data being indicative of the first user's interactions with second information chunks previously presented to the first user, and, in response to determining that the first user profile data is similar to the second user profile data, to configure the relevance scoring service to assign second relevance scores to third information chunks to be presented to the second user based at least in part on at least a second portion of the first stored behavior data.

(CRM2) At least one non-transitory, computer-readable medium may be configured as described in paragraph (CRM1), and may be further encoded with additional instructions which, when executed by the at least one processor, further cause the computing system to use at least the first portion of the first stored behavior data to train a first relevance scoring model to assign the first relevance scores to the first information chunks.

(CRM3) At least one non-transitory, computer-readable medium may be configured as described in paragraph (CRM1) or paragraph (CRM2), and may be further encoded with additional instructions which, when executed by the at least one processor, further cause the computing system to configure the relevance scoring service to assign the second relevance scores to the third information chunks at least in part by causing the relevance scoring service to use the first relevance scoring model to assign the second relevance scores to the third information chunks.

(CRM4) At least one non-transitory, computer-readable medium may be configured as described in paragraph (CRM1) or paragraph (CRM2), and may be further encoded with additional instructions which, when executed by the at least one processor, further cause the computing system to configure the relevance scoring service to assign the second relevance scores to the third information chunks at least in part by using at least the second portion of the first stored behavior data to train a second relevance scoring model to assign the second relevance scores to the third information chunks.

(CRM5) At least one non-transitory, computer-readable medium may be configured as described in any of paragraphs (CRM1) through (CRM4), and may be further encoded with additional instructions which, when executed by the at least one processor, further cause the computing system to detect events of one or more applications to which the second user has access rights, and to generate notifications concerning the detected events; wherein the third information chunks may comprise the notifications.

(CRM6) At least one non-transitory, computer-readable medium may be configured as described in any of paragraphs (CRM1) through (CRM5), and may be further encoded with additional instructions which, when executed by the at least one processor, further cause the computing system to encode second stored behavior data of a plurality of users into feature vectors corresponding to respective ones of the plurality of users; determining one or more clusters of the feature vectors, to determine, for respective ones of the one or more clusters, cluster-specific profile data, the cluster-specific profile data for the respective clusters being based on user profile data of the users whose feature vectors are included in those clusters, and to determine that the first user profile data is similar to the second user profile data at least in part by identifying a first cluster of the one or more clusters that has cluster-specific profile data that most closely resembles the second user profile data of the second user, and wherein a first feature vector for the first user may be included in the first cluster.

(CRM7) At least one non-transitory, computer-readable medium may be configured as described in any of paragraphs (CRM1) through (CRM6), and may be further encoded with additional instructions which, when executed by the at least one processor, further cause the computing system to encode stored user profile data of a plurality of users into feature vectors corresponding to respective ones of the plurality of users, the feature vectors including a first feature vector for the first user and a second feature vector for the second user, to determine one or more clusters of the feature vectors, and to determine that the first user profile data is similar to the second user profile data at least in part by determining that the first feature vector is included in a same cluster as the second feature vector.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
   determining, by a computing system, that first user profile data of a first user of a relevance scoring service is similar to second user profile data of a second user of the relevance scoring service, the relevance scoring service being configured to use a first relevance scoring model to assign first relevance scores to first information chunks to be presented in a first activity feed to the first user, the first relevance scoring model having been trained using at least a first portion of first stored behavior data of the first user, the first stored behavior data being indicative of the first user's interactions with second information chunks previously presented to the first user;
   in response to determining that the first user profile data is similar to the second user profile data, configuring the relevance scoring service to assign second relevance scores to third information chunks to be presented in a second activity feed to the second user by (A) causing the relevance scoring service to use the first relevance scoring model to assign the second relevance scores to the third information chunks, or (B) causing the relevance scoring service to use a second relevance scoring model to assign the second relevance scores to the third information chunks, the second relevance scoring model having been trained using at least a second portion of the first stored behavior data; and
   causing, by the computing system, the third information chunks to be presented in the second activity feed to the second user in an order determined at least in part by the second relevance scores.

2. The method of claim 1, wherein the relevance scoring service is configured to assign the second relevance scores to the third information chunks at least in part by causing the relevance scoring service to use the first relevance scoring model to assign the second relevance scores to the third information chunks.

3. The method of claim 1, wherein the relevance scoring service is configured to assign the second relevance scores to the third information chunks at least in part by using the second relevance scoring model to assign the second relevance scores to the third information chunks.

4. The method of claim 1, further comprising:
   detecting, by the computing system, events of one or more applications to which the second user has access rights; and
   generating, by the computing system, notifications concerning the detected events; and
   wherein the third information chunks comprise the notifications.

5. The method of claim 1, further comprising:
   encoding second stored behavior data of a plurality of users into feature vectors corresponding to respective ones of the plurality of users;
   determining one or more clusters of the feature vectors; and
   determining, for respective ones of the one or more clusters, cluster-specific profile data, the cluster-specific profile data for the respective clusters being based on user profile data of the users whose feature vectors are included in those clusters;
   wherein determining that the first user profile data is similar to the second user profile data comprises identifying a first cluster of the one or more clusters that has cluster-specific profile data that most closely resembles the second user profile data of the second user, wherein a first feature vector for the first user is included in the first cluster.

6. The method of claim 1, further comprising:
   encoding stored user profile data of a plurality of users into feature vectors corresponding to respective ones of the plurality of users, the feature vectors including a first feature vector for the first user and a second feature vector for the second user; and
   determining one or more clusters of the feature vectors;
   wherein determining that the first user profile data is similar to the second user profile data comprises determining that the first feature vector is included in a same cluster as the second feature vector.

7. The method of claim 1, wherein:
   first user profile data represents first identity information about the first user; and
   the second user profile data represents second identity information about the second user.

8. The method of claim 7, wherein:
   the first user profile data further represents first preference settings for the first user; and
   the second user profile data further represents second preference settings for the second user.

9. A system, comprising:
   at least one processor; and
   at least one computer-readable medium encoded with instructions which, when executed by the at least one processor, cause the system to:
      determine that first user profile data of a first user of a relevance scoring service is similar to second user profile data of a second user of the relevance scoring service, the relevance scoring service being configured to use a first relevance scoring model to assign first relevance scores to first information chunks to be presented in a first activity feed to the first user, the first relevance scoring model having been trained using at least a first portion of first stored behavior data of the first user, the first stored behavior data being indicative of the first user's interactions with second information chunks previously presented to the first user;

in response to determining that the first user profile data is similar to the second user profile data, configure the relevance scoring service to assign second relevance scores to third information chunks to be presented in a second activity feed to the second user by (A) causing the relevance scoring service to use the first relevance scoring model to assign the second relevance scores to the third information chunks, or (B) causing the relevance scoring service to use a second relevance scoring model to assign the second relevance scores to the third information chunks, the second relevance scoring model having been trained using at least a second portion of the first stored behavior data; and cause the third information chunks to be presented in the second activity feed to the second user in an order determined at least in part by the second relevance scores.

10. The system of claim 9, wherein the at least one computer-readable medium is further encoded with additional instructions which, when executed by the at least one processor, further cause the system to configure the relevance scoring service to assign the second relevance scores to the third information chunks at least in part by causing the relevance scoring service to use the first relevance scoring model to assign the second relevance scores to the third information chunks.

11. The system of claim 9, wherein the at least one computer-readable medium is further encoded with additional instructions which, when executed by the at least one processor, further cause the system to configure the relevance scoring service to assign the second relevance scores to the third information chunks at least in part by using the second relevance scoring model to assign the second relevance scores to the third information chunks.

12. The system of claim 9, wherein the at least one computer-readable medium is further encoded with additional instructions which, when executed by the at least one processor, further cause the system to:
detect events of one or more applications to which the second user has access rights; and
generate notifications concerning the detected events; and
wherein the third information chunks comprise the notifications.

13. The system of claim 9, wherein the at least one computer-readable medium is further encoded with additional instructions which, when executed by the at least one processor, further cause the system to:
encode second stored behavior data of a plurality of users into feature vectors corresponding to respective ones of the plurality of users;
determine one or more clusters of the feature vectors;
determine, for respective ones of the one or more clusters, cluster-specific profile data, the cluster-specific profile data for the respective clusters being based on user profile data of the users whose feature vectors are included in those clusters; and
determine that the first user profile data is similar to the second user profile data at least in part by identifying a first cluster of the one or more clusters that has cluster-specific profile data that most closely resembles the second user profile data of the second user, wherein a first feature vector for the first user is included in the first cluster.

14. The system of claim 9, wherein the at least one computer-readable medium is further encoded with additional instructions which, when executed by the at least one processor, further cause the system to:
encode stored user profile data of a plurality of users into feature vectors corresponding to respective ones of the plurality of users, the feature vectors including a first feature vector for the first user and a second feature vector for the second user;
determine one or more clusters of the feature vectors; and
determine that the first user profile data is similar to the second user profile data at least in part by determining that the first feature vector is included in a same cluster as the second feature vector.

15. The system of claim 9, wherein:
first user profile data represents first identity information about the first user; and
the second user profile data represents second identity information about the second user.

16. The system of claim 15, wherein:
the first user profile data further represents first preference settings for the first user; and
the second user profile data further represents second preference settings for the second user.

17. At least one non-transitory computer-readable medium encoded with instructions which, when executed by at least one processor of a computing system, cause the computing system to:
determine that first user profile data of a first user of a relevance scoring service is similar to second user profile data of a second user of the relevance scoring service, the relevance scoring service being configured to use a first relevance scoring model to assign first relevance scores to first information chunks to be presented in a first activity feed to the first user, the first relevance scoring model having been trained using at least a first portion of first stored behavior data of the first user, the first stored behavior data being indicative of the first user's interactions with second information chunks previously presented to the first user;
in response to determining that the first user profile data is similar to the second user profile data, configure the relevance scoring service to assign second relevance scores to third information chunks to be presented in a second activity feed to the second user by (A) causing the relevance scoring service to use the first relevance scoring model to assign the second relevance scores to the third information chunks, or (B) causing the relevance scoring service to use a second relevance scoring model to assign the second relevance scores to the third information chunks, the second relevance scoring model having been trained using at least a second portion of the first stored behavior data; and
cause the third information chunks to be presented in the second activity feed to the second user in an order determined at least in part by the second relevance scores.

18. The at least one non-transitory computer-readable medium of claim 17, further encoded with additional instructions which, when executed by the at least one processor, further cause the system to configure the relevance scoring service to assign the second relevance scores to the third information chunks at least in part by causing the relevance scoring service to use the first relevance scoring model to assign the second relevance scores to the third information chunks.

19. The at least one non-transitory computer-readable medium of claim 17, further encoded with additional instructions which, when executed by the at least one processor, further cause the system to configure the relevance scoring service to assign the second relevance scores to the third information chunks at least in part by using the second relevance scoring model to assign the second relevance scores to the third information chunks.

20. The at least one non-transitory computer-readable medium of claim 17, further encoded with additional instructions which, when executed by the at least one processor, further cause the computing system to:
- encode second stored behavior data of a plurality of users into feature vectors corresponding to respective ones of the plurality of users;
- determine one or more clusters of the feature vectors;
- determine, for respective ones of the one or more clusters, cluster-specific profile data, the cluster-specific profile data for the respective clusters being based on user profile data of the users whose feature vectors are included in those clusters; and
- determine that the first user profile data is similar to the second user profile data at least in part by identifying a first cluster of the one or more clusters that has cluster-specific profile data that most closely resembles the second user profile data of the second user, wherein a first feature vector for the first user is included in the first cluster.

21. The at least one non-transitory computer-readable medium of claim 17, further encoded with additional instructions which, when executed by the at least one processor, further cause the computing system to:
- encode stored user profile data of a plurality of users into feature vectors corresponding to respective ones of the plurality of users, the feature vectors including a first feature vector for the first user and a second feature vector for the second user;
- determine one or more clusters of the feature vectors; and
- determine that the first user profile data is similar to the second user profile data at least in part by determining that the first feature vector is included in a same cluster as the second feature vector.

22. The at least one non-transitory computer-readable medium of claim 17, wherein:
- first user profile data represents first identity information about the first user; and
- the second user profile data represents second identity information about the second user.

23. The at least one non-transitory computer-readable medium of claim 22, wherein:
- the first user profile data further represents first preference settings for the first user; and
- the second user profile data further represents second preference settings for the second user.

* * * * *